(12) United States Patent
Agarwal et al.

(10) Patent No.: US 10,387,807 B2
(45) Date of Patent: Aug. 20, 2019

(54) SYSTEMS AND METHODS FOR PROVIDING AND ACCESSING VISUAL PRODUCT REPRESENTATIONS OF A PROJECT

(71) Applicant: TRANSFORM SR BRANDS LLC, Hoffman Estates, IL (US)

(72) Inventors: Shubham Agarwal, Arlington Heights, IL (US); Eui Chung, Huntley, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 160 days.

(21) Appl. No.: 14/202,980

(22) Filed: Mar. 10, 2014

(65) Prior Publication Data

US 2014/0258428 A1    Sep. 11, 2014

Related U.S. Application Data

(60) Provisional application No. 61/776,570, filed on Mar. 11, 2013.

(51) Int. Cl.
| | |
|---|---|
| *G06Q 10/06* | (2012.01) |
| *G06Q 10/00* | (2012.01) |
| *G06Q 10/10* | (2012.01) |
| *H04L 12/58* | (2006.01) |
| *H04L 29/06* | (2006.01) |

(52) U.S. Cl.
CPC ............ *G06Q 10/06* (2013.01); *G06Q 10/10* (2013.01); *G06Q 10/20* (2013.01); *H04L 51/04* (2013.01); *H04L 65/403* (2013.01)

(58) Field of Classification Search
CPC ........ G06Q 10/10; G06Q 10/20; G06Q 10/06; G06Q 50/01; G06Q 30/0633; G06Q 10/101; H04L 51/04; H04L 65/403
See application file for complete search history.

(56) References Cited

U.S. PATENT DOCUMENTS

| | | | | |
|---|---|---|---|---|
| 2002/0188547 | A1* | 12/2002 | Banerjee | G06Q 10/087 705/37 |
| 2004/0143811 | A1* | 7/2004 | Kaelicke | G06Q 10/10 717/101 |
| 2004/0167787 | A1* | 8/2004 | Lynch | G06Q 10/06 705/7.27 |
| 2010/0238194 | A1* | 9/2010 | Roach, Jr. | H04M 3/42 345/629 |

FOREIGN PATENT DOCUMENTS

WO    2005029453 A2    3/2005

OTHER PUBLICATIONS

European Patent Office, Communication with extended European search report, in Application No. 14158945.7-1955, dated May 2, 2014 (8 pages).

(Continued)

*Primary Examiner* — Tamara T Kyle
(74) *Attorney, Agent, or Firm* — McAndrews, Held & Malloy, Ltd.

(57) ABSTRACT

Various embodiments include systems and methods that provide a socially interactive application for requesting, searching, and sharing visual step-by-step instructions and related information to complete a project.

16 Claims, 24 Drawing Sheets

(56) References Cited

OTHER PUBLICATIONS

Official Journal of the European Patent Office, vol. 30, No. 11, Nov. 1, 2007, pp. 592-593, XP007905525, ISSN: 0170-9291 (2 pages).
Canadian Office Action dated Apr. 5, 2016 for Canadian Patent Application No. 2,845,268.
allrecipes.com Launches "On-the-Go" Access to World's Most Trusted Online Cooking Resources With allrecipes.com Mobile. Allrecipes.com Press Releases, Seattle, WA, Jun. 27, 2007.
New Online Food Community Launches to Offer Everyday Delight and Inspiration, Allrecipes.com Press Releases, Seattle, WA, Jul. 15, 2008.
Mexican Patent Office Communication, Office Action for Mexican Patent Application No. MX/a/2014/002932, dated May 24, 2017, 10 pages.
European Patent Office Communication, Summons for European Patent Application No. 14158945.7, dated Apr. 6, 2018, 10 pages.

* cited by examiner

Optional Details

Skill level: Kids stuff | Semi-pro | Professional

Makeboard: Select a Makeboard ▼

Time to complete: Select time to complete ▼

Cost to complete: Enter cost to complete your project

---

Maker: Jamie Oliver — 344 followers [Follow]

Makeboard: Recipes — 243 followers [Follow]

---

Details
Skill level: Semi-pro
Time to complete: 15-30 minutes
Cost to complete: $ 18.00

SYSTEMS AND METHODS FOR PROVIDING AND ACCESSING VISUAL PRODUCT REPRESENTATIONS OF A PROJECT

CROSS-REFERENCE TO RELATED APPLICATIONS/INCORPORATION BY REFERENCE

The present application claims priority under 35 U.S.C. § 119(e) to provisional application Ser. No. 61/776,570, filed on Mar. 11, 2013. The above referenced provisional application is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Technology, such as the use of internet-connected desktop and/or mobile devices, can enable users to search for and/or provide instructions for completing various projects. For example, a user may access a search engine to attempt to locate instructions for remodeling a bathroom. As another example, a user can upload a recipe for grilled tuna with tomato spaghetti and salad to a website for access by other users. At the present time, however, information regarding projects that may be of interest to users may not be readily identifiable, can be difficult to locate, and/or may be unavailable.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method that provides a socially interactive application for requesting, searching, and sharing visual step-by-step instructions and related information to complete a project, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 9 is a screenshot illustrating an exemplary application homepage layout for display at a computing device display, in accordance with a representative embodiment of the present invention.

FIG. 11 is screenshots illustrating an exemplary method for providing and displaying accompanying project information, in accordance with a representative embodiment of the present invention.

DETAILED DESCRIPTION OF THE INVENTION

Aspects of the present invention are related to systems and methods supporting access to an application for users to discover and share projects. More specifically, certain embodiments of the present invention relate to systems and methods that provide a socially interactive application for requesting, searching, and sharing visual step-by-step instructions and related information to complete a project.

A representative embodiment of the present invention aids users of internet-connected desktop and/or mobile devices with requesting, searching, and/or sharing information to complete a project.

As utilized herein, the terms "exemplary" or "example" means serving as a non-limiting example, instance, or illustration. As utilized herein, the term "e.g." introduces a list of one or more non-limiting examples, instances, or illustrations.

Figure 1:
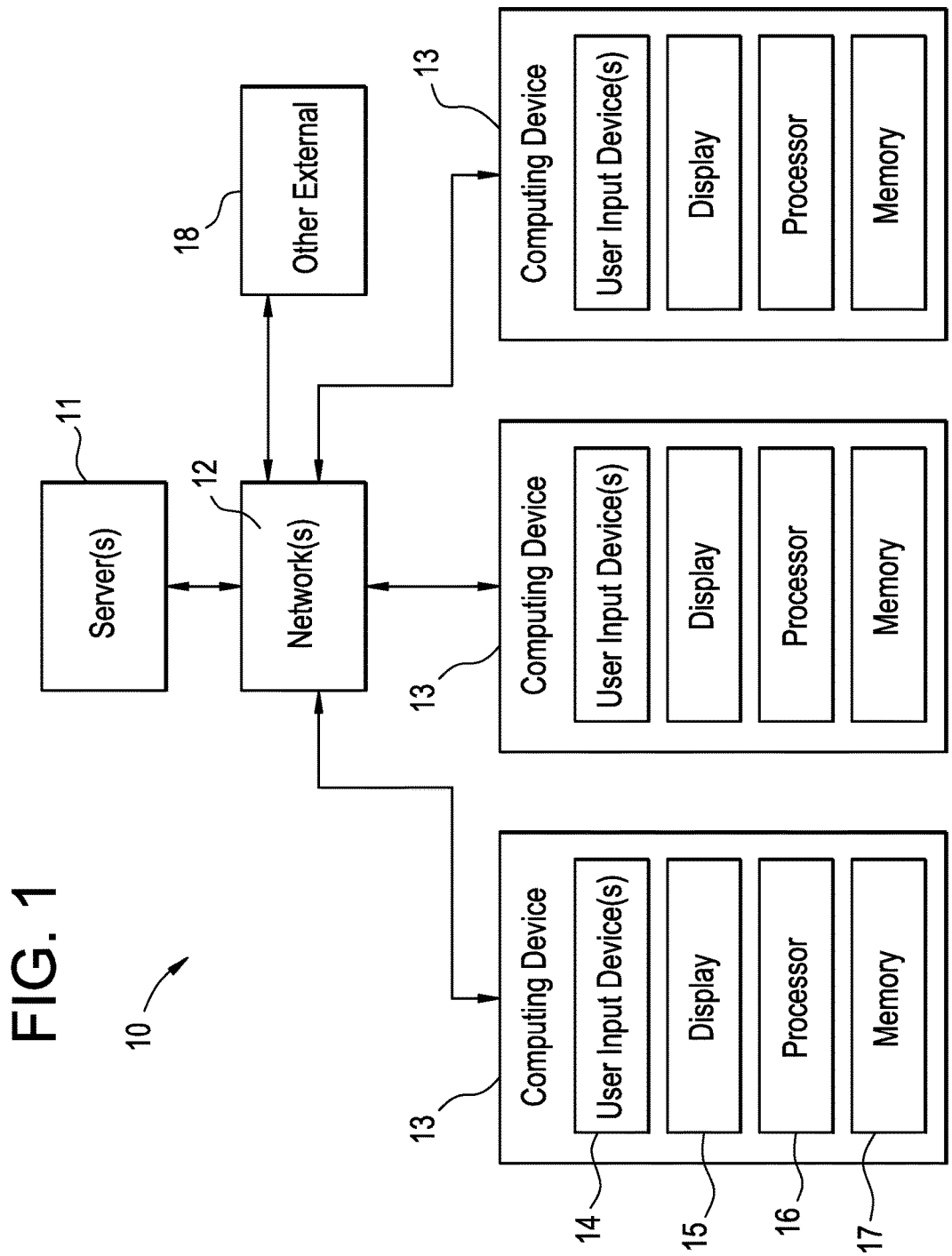
FIG. 1 is a block diagram of an exemplary system in which a representative embodiment of the present invention may be practiced.

FIG. 1 is a block diagram of an exemplary system 10 in which a representative embodiment of the present invention may be practiced. As illustrated in FIG. 1, the system 10 includes one or more servers 11. The server(s) 11 may include, for example, web server(s), database server(s), application server(s), and the like. The server(s) 11 may be interconnected, and may singly or as a group be connected to a network 12, such as the Internet, for example, via any suitable combination of wired or wireless data communication links. FIG. 1 also includes external systems and applications 18. The external systems and applications 18 may be interconnected, and may singly or as a group be connected to a network 12, such as the Internet, for example, via any suitable combination of wired or wireless data communication links.

FIG. 1 includes one or more computing devices 13, which are connected to the network 12 by any suitable combination of wired or wireless data communication links. Computing device(s) 13 may be any of, for example, a desktop computer, a laptop computer, a notebook computer, a netbook computer, a tablet computer, a mobile phone, or any other electronic device having capabilities suitable for accessing the network 12. In various embodiments, the computing device(s) 13 includes user input device(s) 14, a display 15, a processor 16, and memory 17, among other things. Components of the computing device(s) 13 may be implemented in software, hardware, firmware, and/or the like. The various components of the computing device(s) 13 may be communicatively linked. Components of the computing device(s) 13 may be implemented separately and/or integrated in various forms. For example, the display 15 and the user input device(s) 14 may be integrated as a touchscreen display.

The user input device(s) 14 may include any device(s) capable of communicating information from a user and/or at the direction of the user to the processor 16 of the computing device 13, for example. The user input device(s) 14 may include button(s), a touchscreen, motion tracking, voice recognition, a mousing device, keyboard, camera and/or any other device capable of receiving a user directive. In certain embodiments, one or more of the user input devices 14 may be integrated into other components, such as the display 15, for example. As an example, user input device 14 may include a touchscreen display.

The display 15 may be any device capable of communicating visual information to a user. For example, a display 15 may include a liquid crystal display, a light emitting diode display, and/or any suitable display. The display 15 can be operable to display information from a project sharing application, or any suitable information. In various embodiments, the display 15 may display information provided by the processor 16, for example.

The processor 16 may be one or more central processing units, microprocessors, microcontrollers, and/or the like. The processor 16 may be an integrated component, or may be distributed across various locations, for example. The processor 16 may be capable of executing software applications, receiving input information from user input device(s) 14, and generating an output displayable by a display 15, among other things. The processor 16 may be capable of executing any of the method(s) and/or set(s) of instructions discussed below in accordance with the present invention, for example. In certain embodiments, the processor 16 may execute one or more project sharing applications available at server(s) 11 and/or stored at the computing device(s) 13 in response to user inputs received from user input device(s) 14, for example.

In various embodiments, the information provided by the user input device(s) 14 to the processor 16 may be processed by the processor 16 to control one or more applications for sharing project information, for example. As an example, button depressions, touchscreen selections, mousing inputs, keyboard inputs, and/or voice commands, among other things, may be received from the user input device(s) 14 and processed by the processor 16 to request, create, and/or access instructions for completing a project, for example.

The memory 17 may be one or more computer-readable memories, for example, such as a hard disk, floppy disk, CD, CD-ROM, DVD, compact storage, flash memory, random access memory, read-only memory, electrically erasable and programmable read-only memory and/or any suitable memory. The memory 17 may include databases, libraries, sets of information, or other storage accessed by and/or incorporated with the processor 16, for example. The memory 17 may be able to store data temporarily or permanently, for example. The memory 17 may be capable of storing data generated by the processor 16 and/or instructions readable by the processor 16, among other things. In various embodiments, the memory 17 stores one or more software applications.

Figure 2:
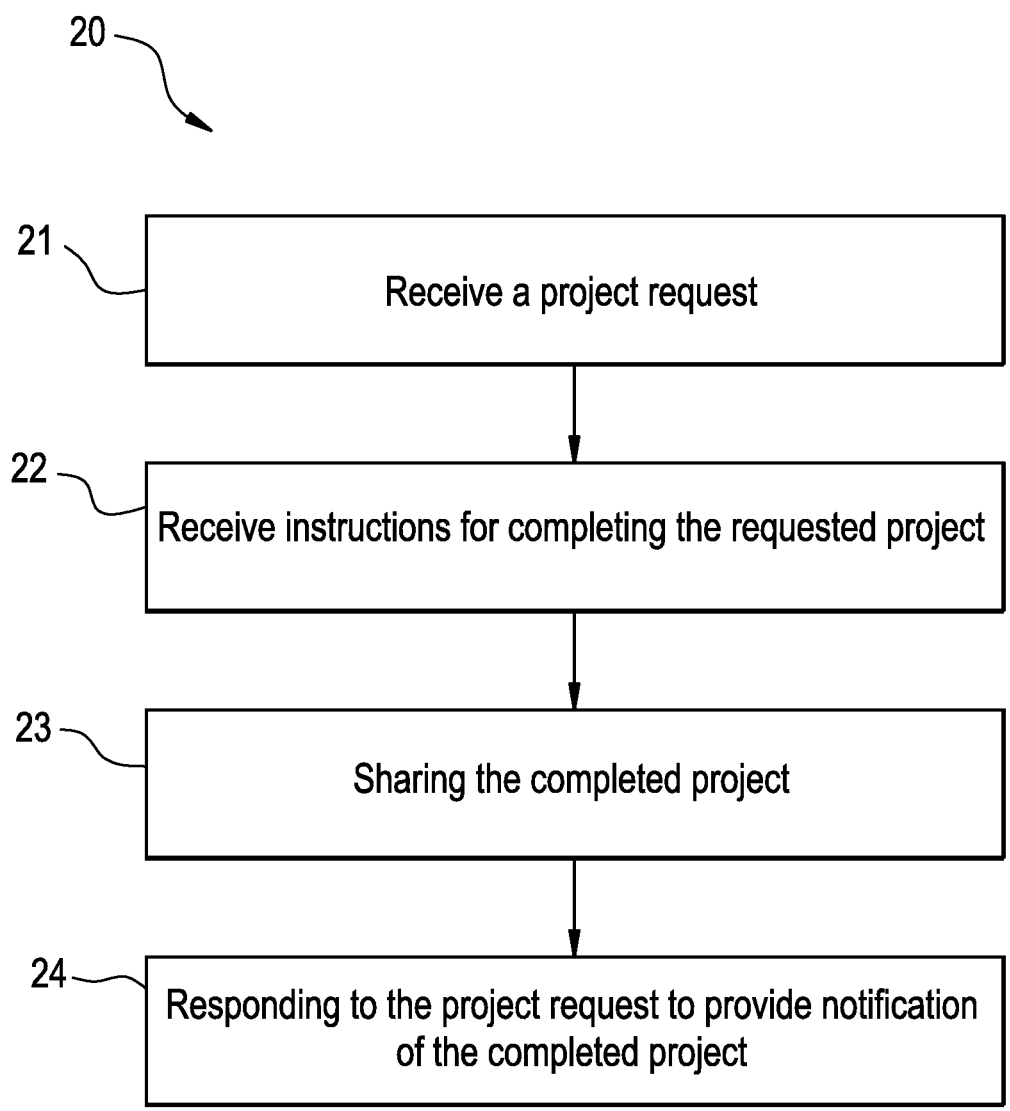
FIG. 2 is a flowchart illustrating an exemplary method for requesting and sharing instructions to complete a project, in accordance with a representative embodiment of the present invention.

FIG. 2 is a flowchart illustrating an exemplary method for requesting and sharing instructions to complete a project, in accordance with a representative embodiment of the present invention. The actions of the method of FIG. 2 may be performed using elements of the system 10 of FIG. 1 including, for example, the server(s) 11, network(s) 12, external systems and applications 18, and/or computing device(s) 13 comprising user input device(s) 14, a display 15, a processor 16, and/or a memory 17. The system 10 may be arranged to support requesting and sharing instructions to complete a project, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed above.

The method 20 of FIG. 2 may begin at block 21, where a project sharing application receives a request for instructions to complete a project. The project sharing application can be executed by processor 16 from memory 17 and/or server(s) 11 over network 12. The executed project sharing application may, for example, be displayed on the display 15 of the computing device 13. The request may be received at processor 15 from user input device(s) 14. The request can include, for example, images and/or text identifying a project that a user desires instructions for completing. For example, a user may desire instructions for making a grilled tuna with tomato spaghetti and salad dish. The user can upload an image of the dish captured by a camera and stored to memory 17 and/or in certain embodiments, capture an image of the dish with a photo acquisition feature of the project sharing application, for example. The photo acquisition feature of the project sharing application can be configured to cooperate with a camera user input device 14, for example.

Figure 6:
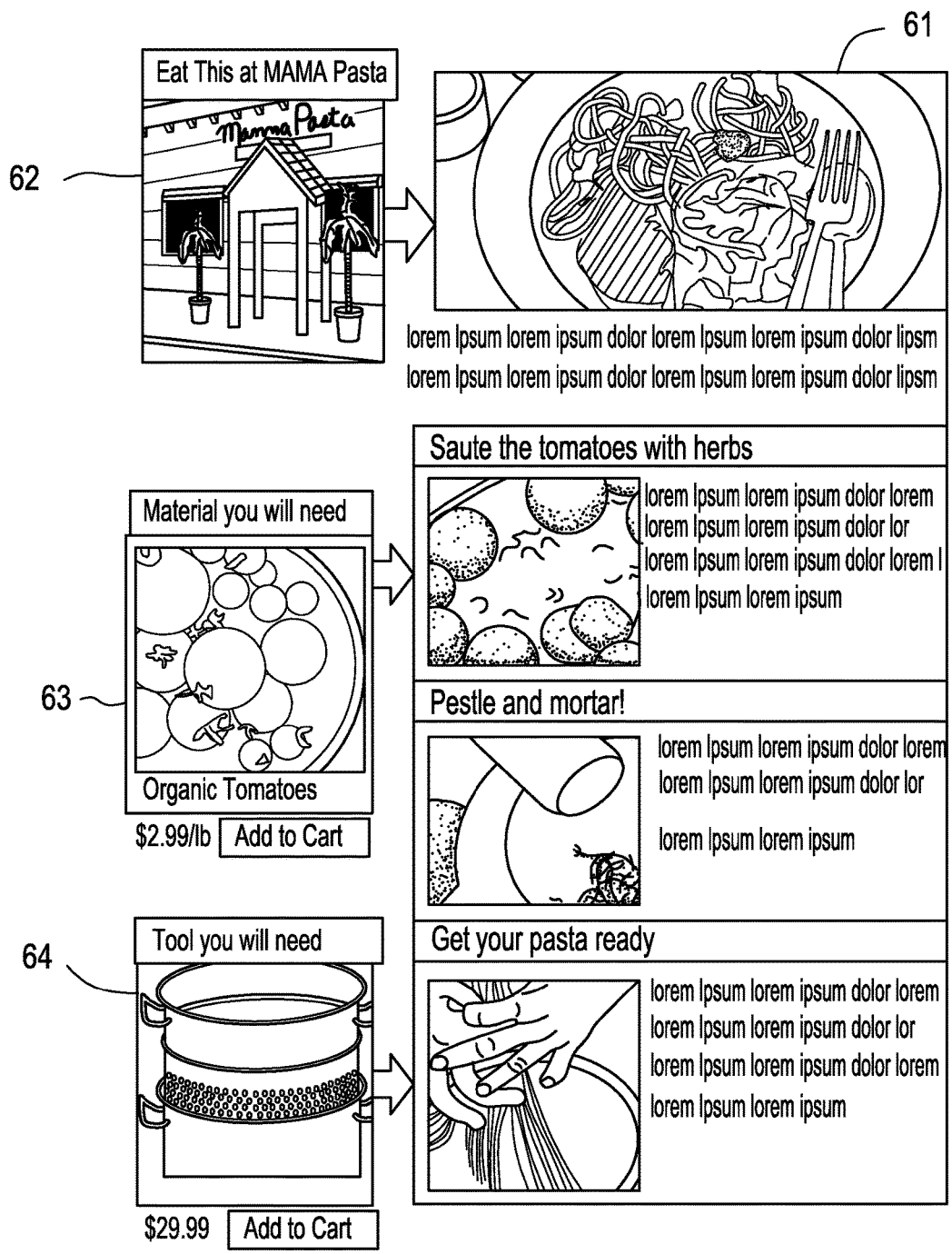
FIG. 6 is a screenshot illustrating an exemplary completed instruction page with image tags for display at a computing device display, in accordance with a representative embodiment of the present invention.

At block 22, the processor 16 executing the project sharing application can receive instructions for completing the requested project. The instructions may include visual, textual, and/or audio step-by-step instructions for completing the requested project. For example, a user can select a project requested at block 21 and provide the project sharing application, via user input device(s) 14 and processor 16 of a computing device 13, a series of images illustrating how to make grilled tuna with tomato spaghetti and salad. One or more of the series of images can be supplemented with textual and/or audio information regarding the instructional step. In certain embodiments, the user can provide accompanying information such as the skill level, time, cost, and the like for completing the project. In various embodiments, the user may tag one or more of the series of images with information related to the supplies, tools, and the like recommended for completing the project. Additionally and/or alternatively, the project sharing application can automatically tag images with information related to supplies, tools, and the like for completing the project. The information related to supplies and tools can include, as illustrated in FIG. 6, for example, information and/or links to where the supplies and tools may be purchased, the cost of the supplies and tools, and/or any other suitable information. In certain embodiments, the user and/or project sharing application can provide, as illustrated in FIG. 6, for example, information and/or links to where the completed project may be purchased, for example.

Next, at block 23, the project sharing application can share the completed project with one or more users or groups of users. For example, the grilled tuna with tomato spaghetti and salad project completed at block 22 may be shared with the user requesting the project at block 21. The completed project can also be shared with socially-associated users, users interested in a category of the completed project, and/or any suitable users. The completed project can be provided at display 15 of a computing device 13 executing the project sharing application, for example. In certain embodiments, the completed projects are stored on memory 17 and/or servers 11.

At block 24, the project sharing application may provide a notification that the project requested a block 21 is completed. For example, the project sharing application can send an electronic mail message, provide a message within the project sharing application, and/or post the completed project to a homepage of the project sharing application account associated with the user that requested the project at block 21.

Figure 3:
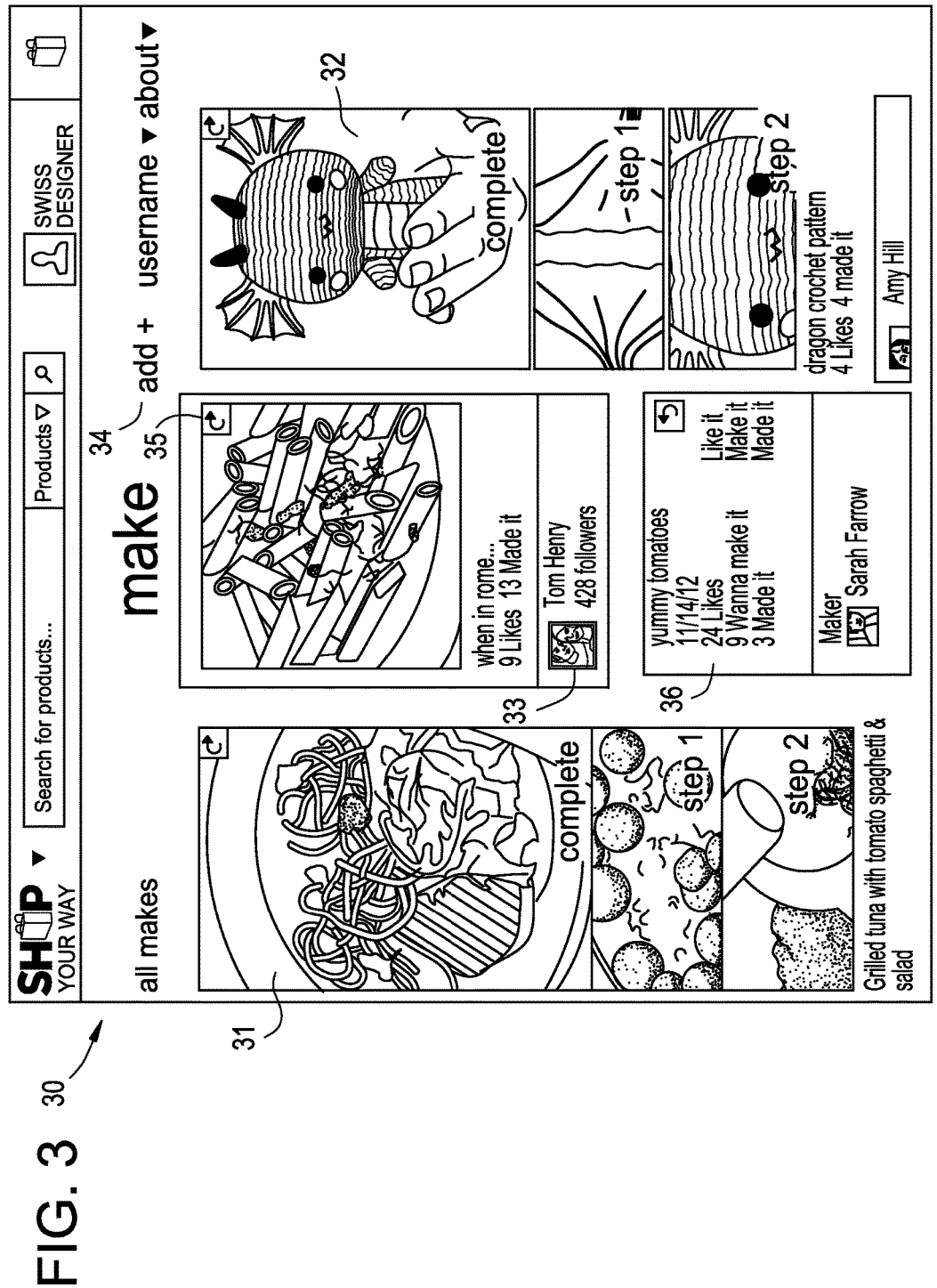
FIG. 3 is a screenshot illustrating an exemplary application homepage layout for display at a computing device display, in accordance with a representative embodiment of the present invention.

FIG. 3 is a screenshot illustrating an exemplary application homepage layout 30 for display at a computing device display 15, in accordance with a representative embodiment of the present invention. The screenshot of FIG. 3 may be displayed using elements of the system 10 of FIG. 1 including, for example, the server(s) 11, network(s) 12, external systems and applications 18, and/or computing device(s) 13 comprising user input device(s) 14, a display 15, a processor 16, and/or a memory 17. The system 10 may be arranged to support display of project-related information, for example. As illustrated in FIG. 3, the application homepage layout 30 can include homepage feeds 31. The homepage feeds 31 can include images corresponding to the project and steps to complete the project 32. The homepage feed 31 can provide information identifying the user that created the completed project 33. In various embodiments, a link, button, menu option, or any suitable selection mechanism may be included on the application homepage 30 for adding a new completed project 34. The homepage feed 31 may include a link, button, menu option, or any suitable selection mechanism for providing a quick view of metadata associated with the completed project 35. For example, selecting the quick view button 35 can provide information regarding the user that created the project, a category (e.g., recipes, toys, furniture, clothes, among other things) associated with the project, the skill level needed to complete the project, the amount of time needed to complete the project, a project cost, and/or any suitable information related to the project. The application homepage layout 30 may include social actions 36 associated with a completed project, for example. The social actions 36 can include mechanisms to indicate that a user likes the completed project, would like to make the completed project, and/or has made the completed project, for example. In certain embodiments, the social actions 36 can also display the number of users that selected each of the social mechanisms.

Figure 4:
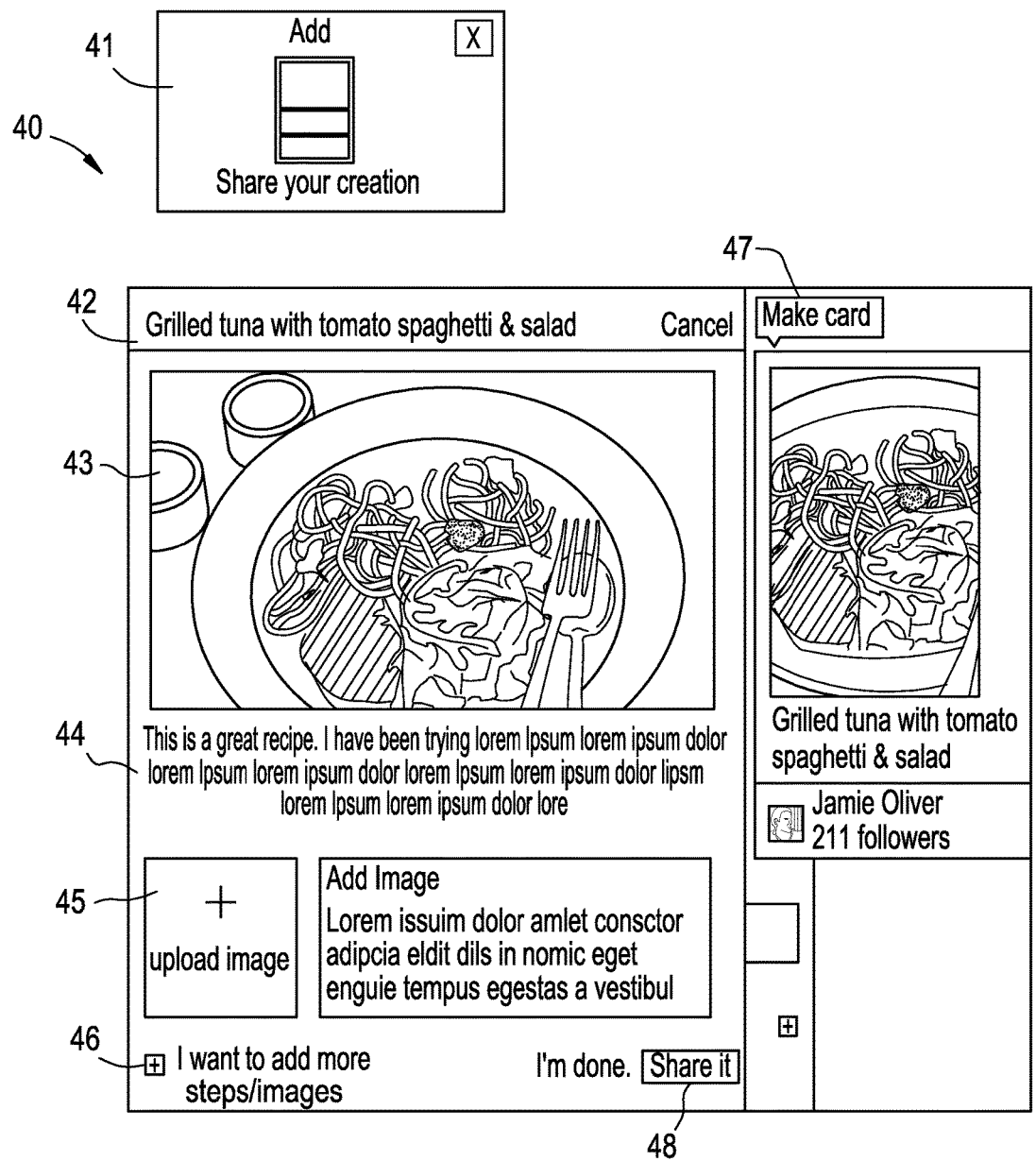
FIG. 4 is screenshots illustrating an exemplary method for sharing instructions to complete a project, in accordance with a representative embodiment of the present invention.

FIG. 4 is screenshots illustrating an exemplary method 40 for sharing instructions to complete a project, in accordance with a representative embodiment of the present invention. The screenshots of FIG. 4 may be displayed using elements of the system 10 of FIG. 1 including, for example, the server(s) 11, network(s) 12, external systems and applications 18, and/or computing device(s) 13 comprising user input device(s) 14, a display 15, a processor 16, and/or a memory 17. The system 10 may be arranged to facilitate the creation and sharing of instructions, for example. As illustrated in FIG. 4, a menu option, button, link, or the like can be provided to add a project 41. The add a project menu option 41 can correspond with the add button 34 illustrated in FIG. 3, for example. The selection of the add a project menu option 41 may provide a user with a project creation page. The project creation page can provide text boxes, buttons, links, and the like for entering a title of the project 42, uploading a main image for the completed project 43, adding a text description 44 for the main image 43, uploading an image 45 for an instruction step, adding additional steps/images 46, and/or sharing the completed project 48, among other things. The project creation page can include a project preview pane 47 that provides a view of how the completed project may be displayed in a homepage feed 31, such as the homepage feeds 31 illustrated in FIG. 3.

Figure 5:
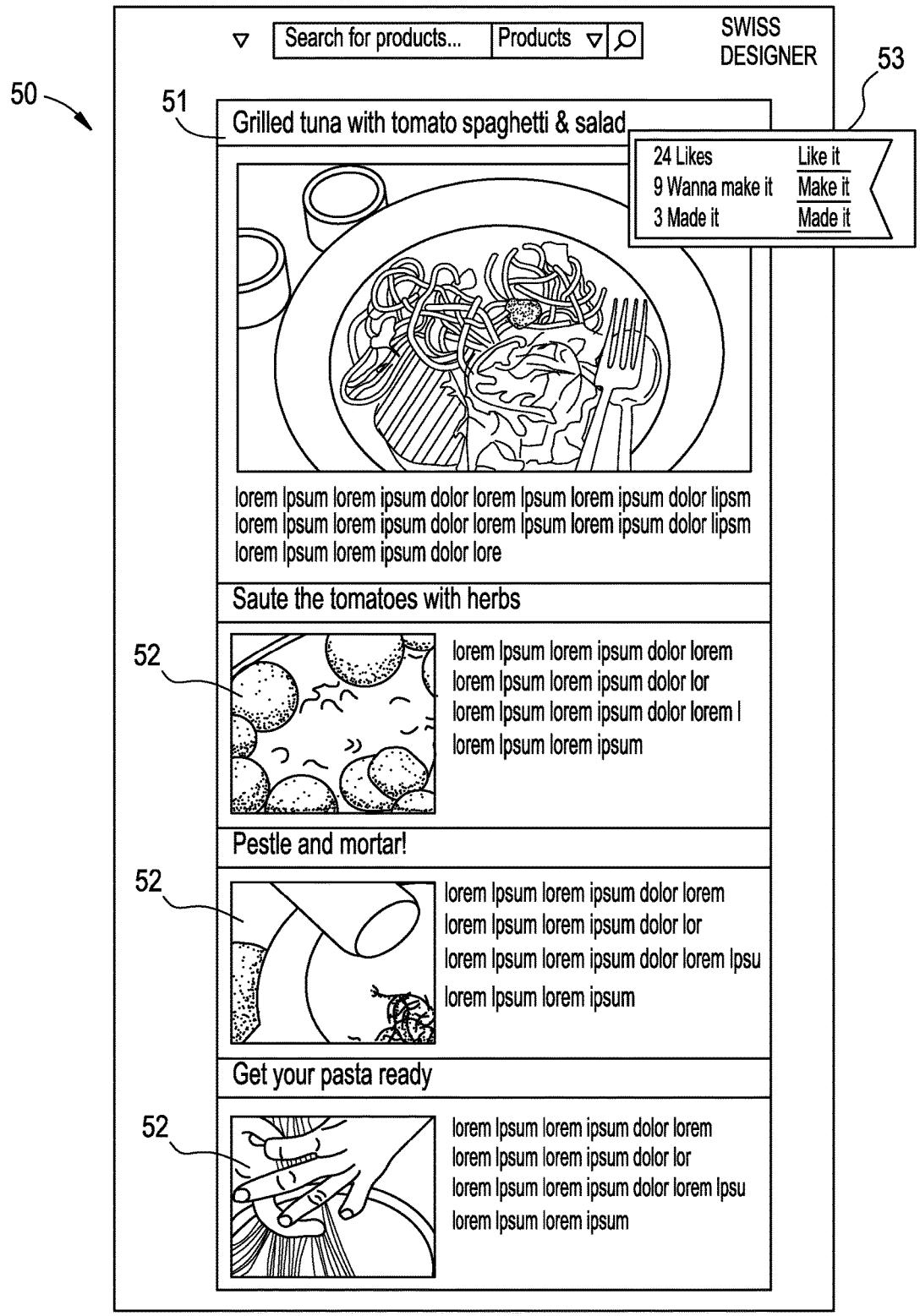
FIG. 5 is a screenshot illustrating an exemplary completed instruction page for display at a computing device display, in accordance with a representative embodiment of the present invention.

FIG. 5 is a screenshot illustrating an exemplary completed instruction page 50 for display at a computing device display 15, in accordance with a representative embodiment of the present invention. The screenshots of FIG. 5 may be displayed using elements of the system 10 of FIG. 1 including, for example, the server(s) 11, network(s) 12, external systems and applications 18, and/or computing device(s) 13 comprising user input device(s) 14, a display 15, a processor 16, and/or a memory 17. The system 10 may be arranged to support display of visual and/or textual step-by-step instructions for completing a project, for example. As illustrated in FIG. 5, a completed instruction page 50 may include a completed project 51. The completed project 51 can include a title of the completed project, an image of the completed project, and textual information regarding the completed project, for example. The completed instruction page 50 can also include one or more steps 52. Each of the steps 52 may include a step summary, an image associated with the step, and a detailed description of the step, for example. In various embodiments, the completed instruction page 50 may include social actions 53 associated with the completed project, for example. The social actions 53 can include mechanisms to indicate that a user likes the completed project, would like to make the completed project, and/or has made the completed project, for example. In certain embodiments, the social actions 53 can also display the number of users that selected each of the social mechanisms.

FIG. 6 is a screenshot illustrating an exemplary completed instruction page 61 with image tags 62-64 for display at a computing device display 15, in accordance with a representative embodiment of the present invention. The screenshots of FIG. 6 may be displayed using elements of the system 10 of FIG. 1 including, for example, the server(s) 11, network(s) 12, external systems and applications 18, and/or computing device(s) 13 comprising user input device(s) 14, a display 15, a processor 16, and/or a memory 17. The system 10 may be arranged to support display of visual and/or textual step-by-step instructions for completing a project, where images associated with the step-by-step instruction include tags 62-64, for example. As illustrated in FIG. 6, the completed instruction page 61 can correspond with the completed instruction page 50 as illustrated in FIG. 5 and discussed above, for example.

The images of the completed instruction 61 can include tags 62-64 to provide information related to the completed project, for example. In various embodiments, the tagged images can provide a user with visual step-by-step instructions that may illustrate techniques for completing the project and indicate the tools and supplies needed to complete the project, for example. In certain embodiments, the main image can be tagged 62 with information and/or links to where the completed project may be purchased, for example. As an example, completed instructions 61 for preparing a pasta dish may include information and/or links to a local restaurant that has the pasta dish on its menu. One or more of the images associated with steps for completing the project may be tagged 63 with information and/or links indicating the supplies needed to complete a project, where the supplies can be purchased, the cost of the supplies, and/or any other suitable information. One or more of the images associated with steps for completing the project can be tagged 64 with information and/or links indicating the tools needed to complete the project, where the tools can be purchased, the cost of the tools, and/or any suitable information. The tags 62-64 may be provided by a user and/or the project sharing application. For example, a user can add tags 62-64 as images are captured or when images are uploaded to the project sharing application, for example. As another example, the project sharing application may add tags 62-62 to uploaded images.

In various embodiments, the tags 62-64 can be used by the project sharing application to recommend projects based on user profile information, such as, for example, user information indicating tools and/or supplies owned and/or commonly used by a user. In certain embodiments, the tags 62-64 can be used by a user to search projects. For example, a user can search for recipes that include supplies in the possession of the user. As another example, a user can search for woodworking projects that use a particular saw owned by the user. In various embodiments, the main image tagged 62 with information related to where the completed project can be purchased may be used by a marketplace feature of the project sharing application. For example, the project sharing application can include a virtual marketplace configured to provide completed projects for user purchase. Certain embodiments provide that the project sharing application can interact with internal and/or external product purchasing applications and/or websites. For example, tag information 62-64 collected by the project sharing application may be used by a corresponding product purchasing application and/or website to provide information related to projects completed using the tool and/or supplies being sold. As an example, a customer accessing a product purchasing application and/or website and viewing a handheld power sander can be provided with information, based on tags 62-64 in the project sharing application, regarding woodworking projects that were completed using the handheld power sander.

Figure 7:
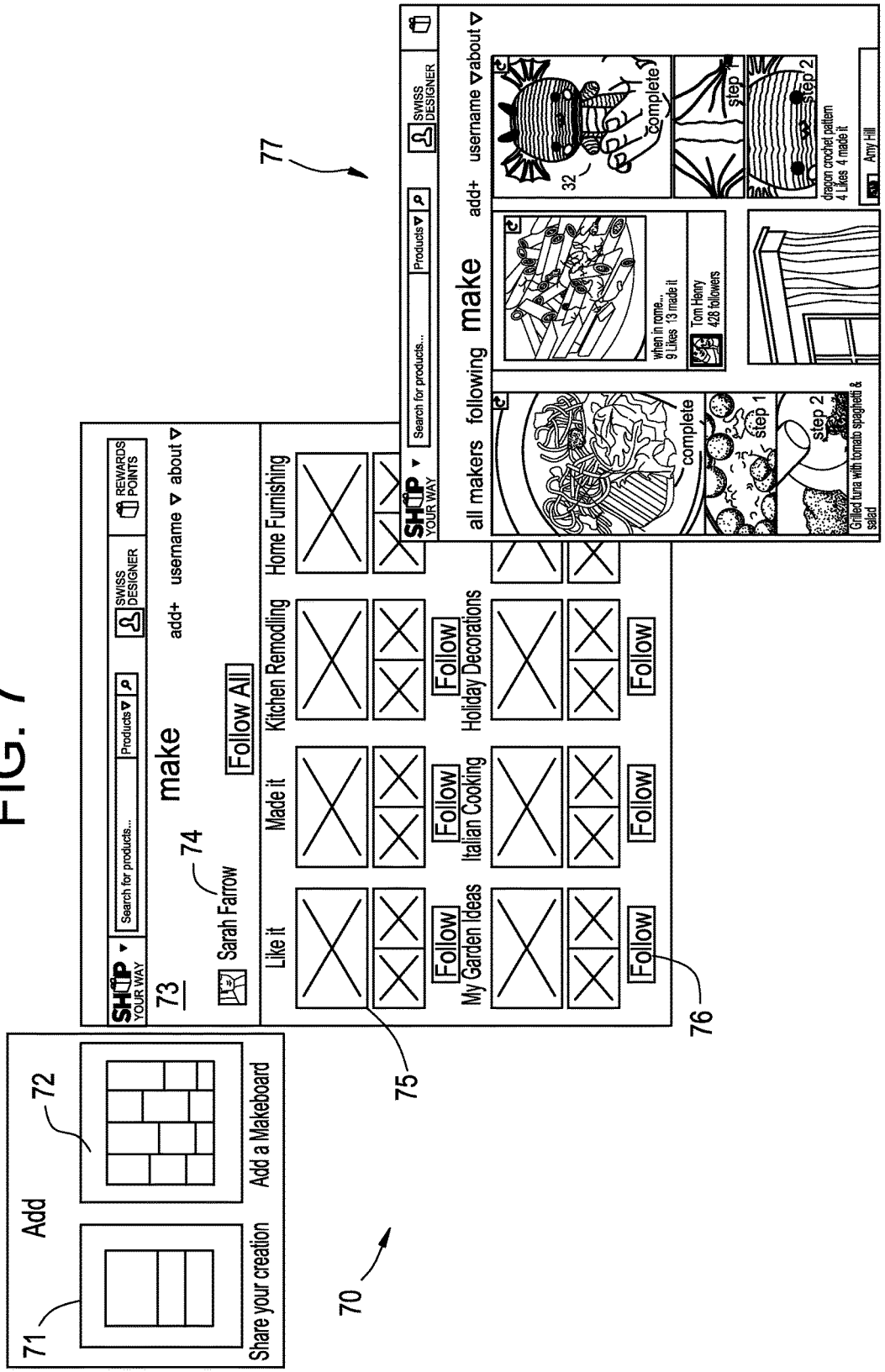
FIG. 7 is screenshots illustrating an exemplary method for creating project categories and/or following created project categories, in accordance with a representative embodiment of the present invention.

FIG. 7 is screenshots illustrating an exemplary method 70 for creating 72 project categories 75 and/or following 76 created project categories 75, in accordance with a representative embodiment of the present invention. The screenshots of FIG. 7 may be displayed using elements of the system 10 of FIG. 1 including, for example, the server(s) 11, network(s) 12, external systems and applications 18, and/or computing device(s) 13 comprising user input device(s) 14, a display 15, a processor 16, and/or a memory 17. The system 10 may be arranged to facilitate the creation of project categories 75 and the display of projects from selected 76 project categories 75, for example. As illustrated in FIG. 7, a menu option, button, link, or the like in an add page or popup window 71 can be provided to add a project category 72. The add page or popup window 71 can be accessed in response to selection of the add button 34 illustrated in FIG. 3, for example. The selection of the add a project category menu option 72 may provide a user with a text box or any suitable mechanism for naming a project category 75 to add to the project category page 73. The project category page 73 can include a user profile 74 identifying the user associated with the project category page 73. The project category page 73 may include a list, grid, or the like of project categories 75. In certain embodiments, the project categories 75 can be selected to access projects associated with the project categories 75. The project categories 75 can include default categories, categories created by a user, and/or categories automatically created by the project sharing application. As an example, default categories can be used to organize projects that correspond with social actions selected by the user (e.g., like it, made it, want to make it, etc.). The project category page 73 can include mechanisms for selecting project categories to display on an application homepage 77, for example. The application homepage 77 may provide menu options, buttons, links, and the like for filtering the homepage feeds 31 (as illustrated in FIG. 3) based on project categories 75, for example.

Figure 8:
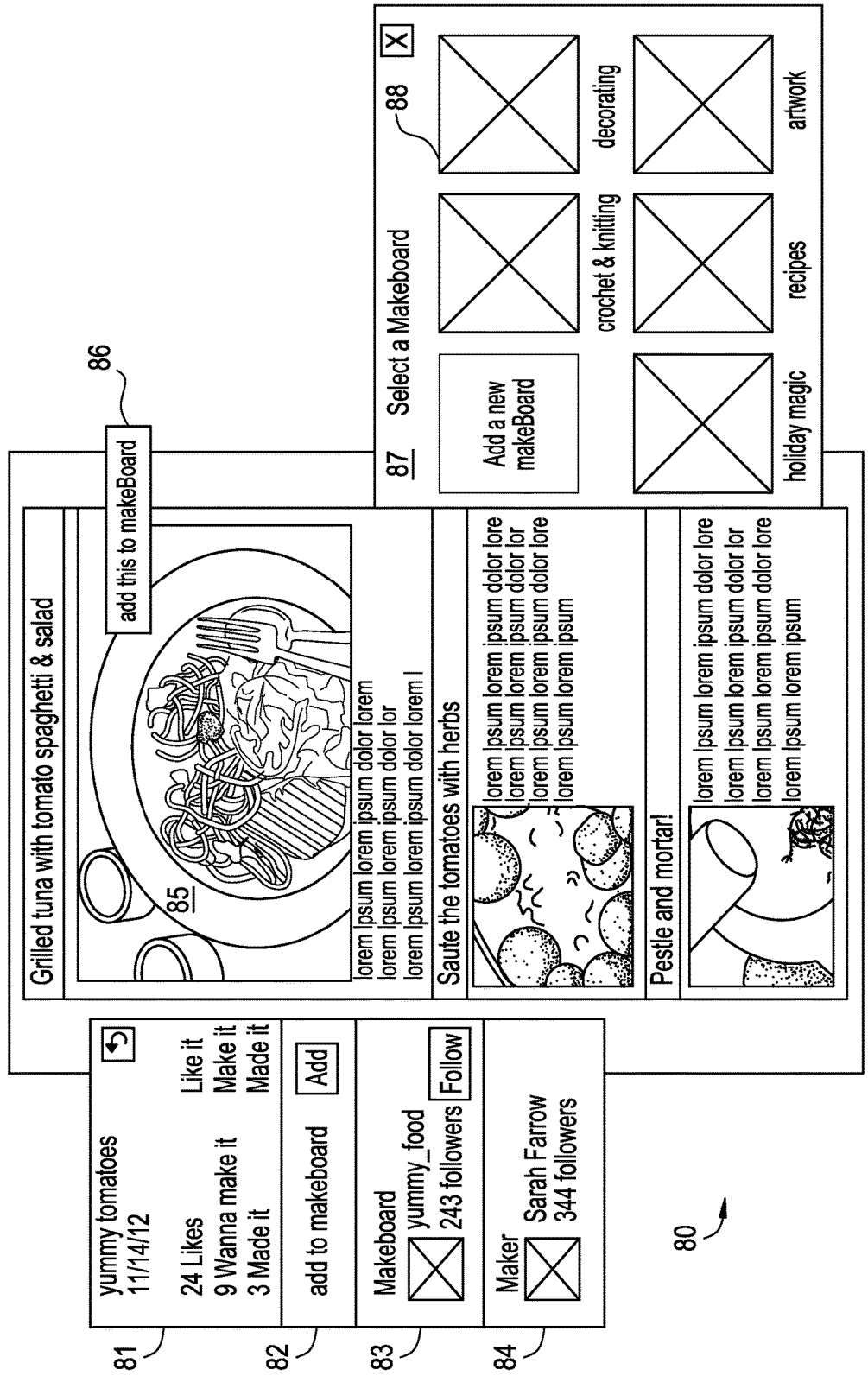
FIG. 8 is screenshots illustrating an exemplary method for adding a completed project to a created project category, in accordance with a representative embodiment of the present invention.

FIG. 8 is screenshots illustrating an exemplary method 80 or adding a completed project to a created project category 88, in accordance with a representative embodiment of the present invention. The screenshots of FIG. 8 may be displayed using elements of the system 10 of FIG. 1 including, for example, the server(s) 11, network(s) 12, external systems and applications 18, and/or computing device(s) 13 comprising user input device(s) 14, a display 15, a processor 16, and/or a memory 17. The system 10 may be arranged to facilitate the addition of completed projects to project categories 88, for example. As illustrated in FIG. 8, a homepage feed 81 for a completed project can include selection mechanisms for adding 82 the completed project to a project category 88, following 83 a project category 88 associated with the completed project, and following 84 a user that created the completed project, among other things. The mechanism for adding 82 the completed project to a project category 88 can trigger the project sharing application to display a project category selection window or page 87. The product category selection window or page 87 may include a list or grid of product categories 88 available for selection. In various embodiments, the project category selection window or page 87 can include a menu option, link, button or the like for adding a new project category, for example. Still referring to FIG. 8, a completed instruction page 85 can include a button, link, menu option or the like for adding 86 the completed project to a project category 88. The mechanism for adding 86 the completed project to a project category 88 may trigger the project sharing application to display the project category selection window or page 87, such that a list or grid of product categories 88 available for selection can be displayed.

Figure 9:
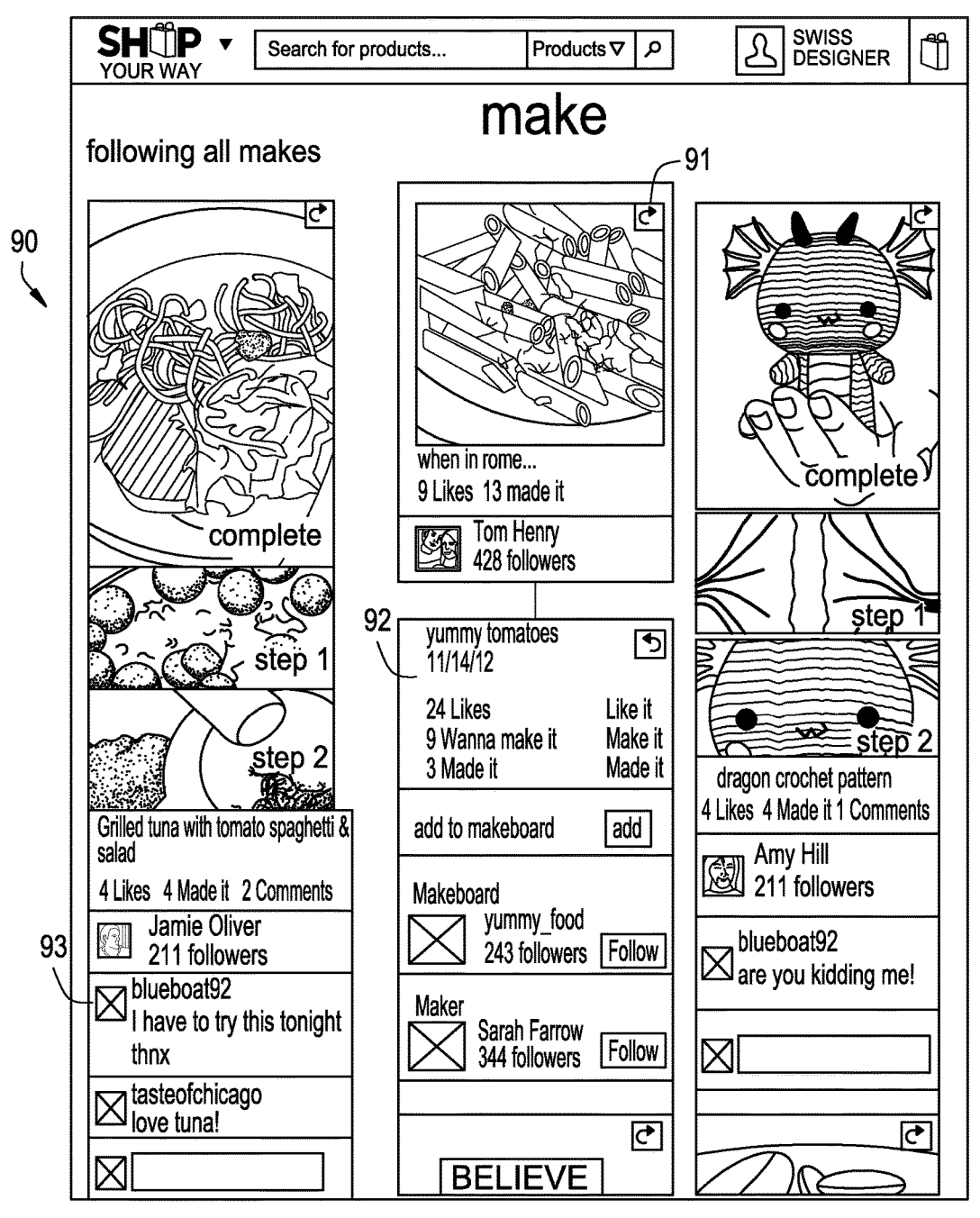

FIG. 9 is a screenshot illustrating an exemplary application homepage layout 90 for display at a computing device display, in accordance with a representative embodiment of the present invention. The screenshot of FIG. 9 may be displayed using elements of the system 10 of FIG. 1 including, for example, the server(s) 11, network(s) 12, external systems and applications 18, and/or computing device(s) 13 comprising user input device(s) 14, a display 15, a processor 16, and/or a memory 17. The system 10 may be arranged to support display of project-related information, for example. As illustrated in FIG. 9, the application homepage layout 90 can include homepage feeds (as illustrated in FIG. 3). The homepage feeds may include a link, button, menu option, or any suitable selection mechanism for providing a quick view of metadata associated with the completed project 91. For example, selecting the quick view button 91 can provide information regarding the user that created the project, a category (e.g., recipes, toys, furniture, clothes, among other things) associated with the project, the skill level needed to complete the project, the amount of time needed to complete the project, a project cost, and/or any suitable information related to the project. In various embodiments, one or more of the homepage feeds may include metadata information, social actions, information regarding the project category, information about the creator of the completed project, options for adding a project category, options for following a project category, and/or options for following a completed project creator, among other things 92. In certain embodiments, one or more of the homepage feeds can include an associated comments section 93. The comments section 93 can include displayed user comments and provide a textbox or any suitable mechanism for adding user comments.

Figure 10:
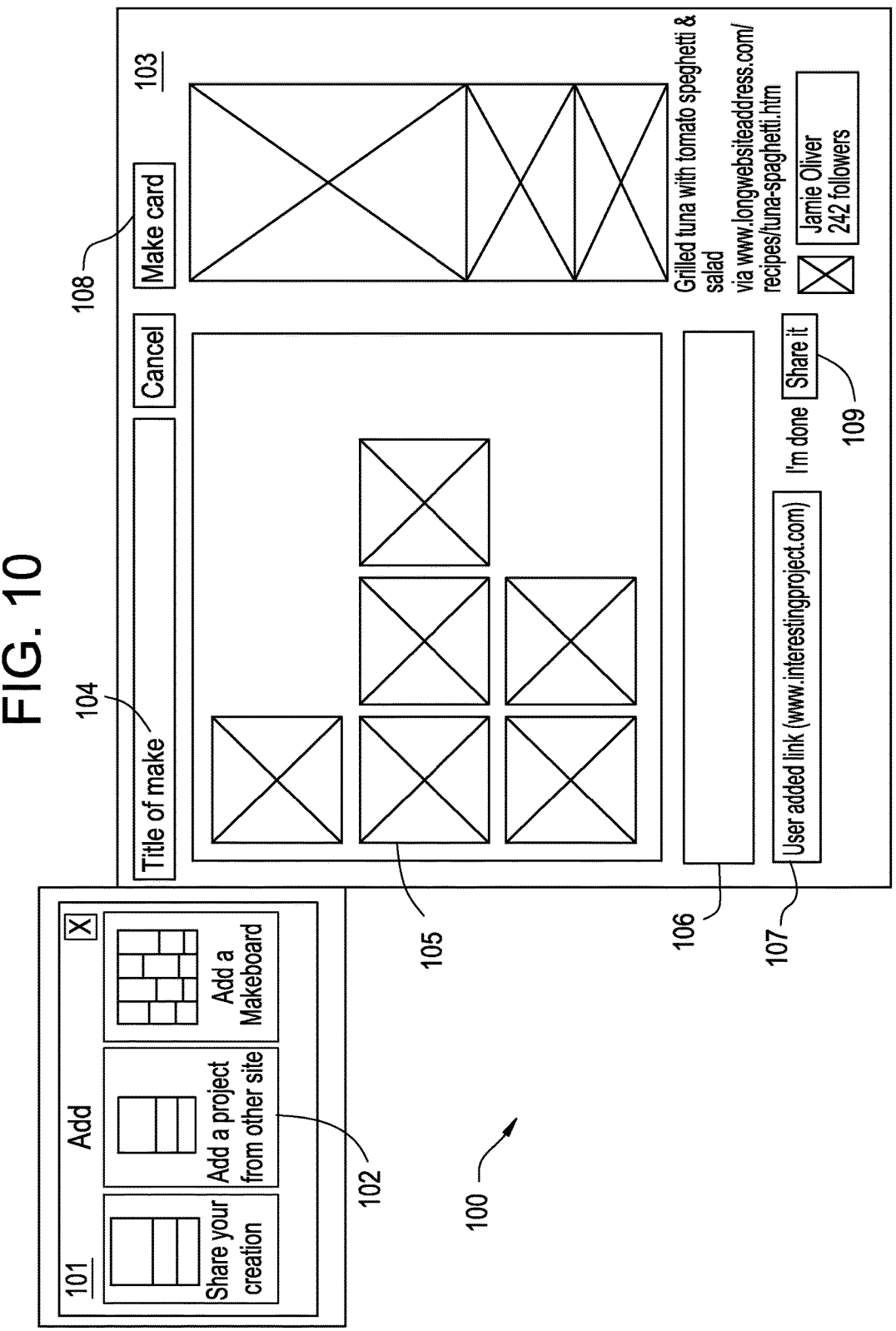
FIG. 10 is screenshots illustrating an exemplary method for adding instructions to complete a project using information extracted from an external application, in accordance with a representative embodiment of the present invention.

FIG. 10 is screenshots illustrating an exemplary method 100 for adding instructions to complete a project using information extracted from an external application 18, in accordance with a representative embodiment of the present invention. The screenshots of FIG. 10 may be displayed using elements of the system 10 of FIG. 1 including, for example, the server(s) 11, network(s) 12, external systems and applications 18, and/or computing device(s) 13 comprising user input device(s) 14, a display 15, a processor 16, and/or a memory 17. The system 10 may be arranged to support the creation and sharing of a completed project based at least in part on images and/or information extracted from an external application or system 18, for example. As illustrated in FIG. 10, a menu option, button, link, or the like in an add page or popup window 101 can be provided to add a project from an external source 102. The add page or popup window 101 can be accessed in response to selection of the add button 34 illustrated in FIG. 3, for example. The selection of the add a project from an external source menu option 102 may trigger the project sharing application to display an external project creation page or window 103. The external project creation page or window 103 may include text boxes, buttons, links, and the like for entering a title of the project 104, displaying images extracted from an external site 105, displaying a text description extracted from the external site 106, providing a link to the external site 107, and/or sharing the completed project 109, among other things. The project creation page can include a project preview pane 108 that provides a view of how the completed project may be displayed in a homepage feed, such as the homepage feeds 31 illustrated in FIG. 3.

FIG. 11 is screenshots illustrating an exemplary method for providing and displaying accompanying project information, in accordance with a representative embodiment of the present invention. The screenshots of FIG. 11 may be displayed using elements of the system 10 of FIG. 1 including, for example, the server(s) 11, network(s) 12, external systems and applications 18, and/or computing device(s) 13 comprising user input device(s) 14, a display 15, a processor 16, and/or a memory 17. The system 10 may be arranged to support the addition and display of details related to the completion of a project, for example. As illustrated in FIG. 11, a project details page or window 111 can provide user-selectable details 111 for association with a completed project. The user-selectable details may include buttons, menu options, or the like for selecting a skill level, an amount of time to complete, an associated product category, and/or a cost to complete, among other things, a completed project. A quick view page 112 can be displayed in response to a selection of a quick view button or menu option, as illustrated in FIGS. 3 and 9, for example. The quick view page 112 may provide metadata associated with a completed project, such as information regarding the user that created the project, a category (e.g., recipes, toys, furniture, clothes, among other things) associated with the project, the skill level needed to complete the project, the amount of time needed to complete the project, a project cost, and/or any suitable information related to the project.

Figure 12:
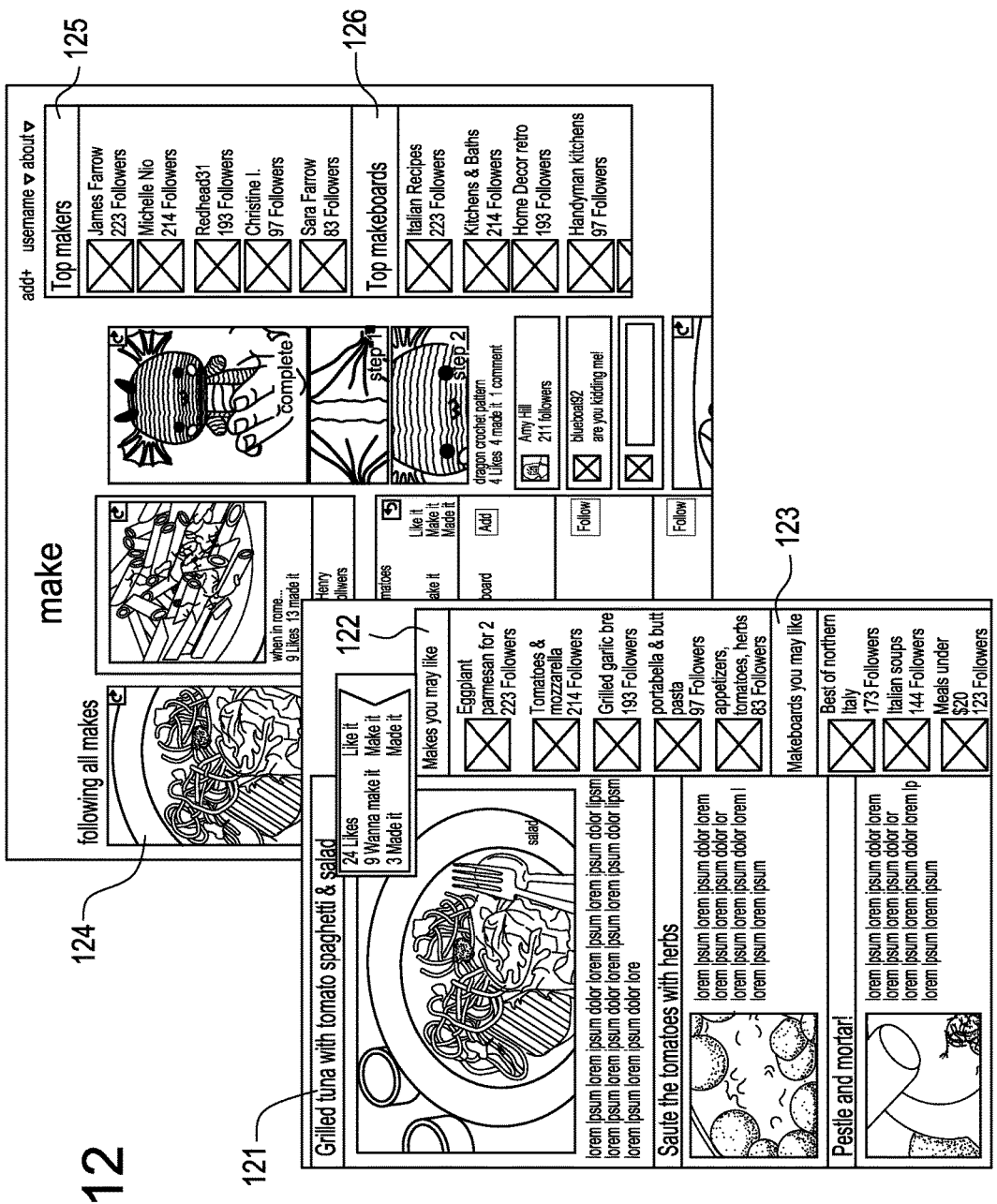
FIG. 12 is screenshots illustrating an exemplary completed instruction page with project and project category recommendations, and an exemplary application homepage layout with project creator and project category recommendations, in accordance with a representative embodiment of the present invention.

FIG. 12 is screenshots illustrating an exemplary completed instruction page 121 with project 122 and project category 123 recommendations, and an exemplary application homepage 124 with project creator 125 and project category 126 recommendations, in accordance with a representative embodiment of the present invention. The screenshots of FIG. 12 may be displayed using elements of the system 10 of FIG. 1 including, for example, the server(s) 11, network(s) 12, external systems and applications 18, and/or computing device(s) 13 comprising user input device(s) 14, a display 15, a processor 16, and/or a memory 17. The system 10 may be arranged to facilitate providing recommendations of completed projects and project categories, for example. As illustrated in FIG. 12, a completed instruction page 121 can include recommendations for completed projects 122 and project categories 123, for example. The recommendations 122, 123 may be provided by the project sharing application based on the completed instruction page 121 being viewed and/or any suitable user profile and/or preference information. An application homepage 124 can include recommendations for project creators 125 and project categories 126, for example. The recommendations 125, 126 may be provided by the project sharing application based on level of interest by users of the project sharing application based on social actions, user profile information, user preference information, and/or any suitable information.

Figure 13:
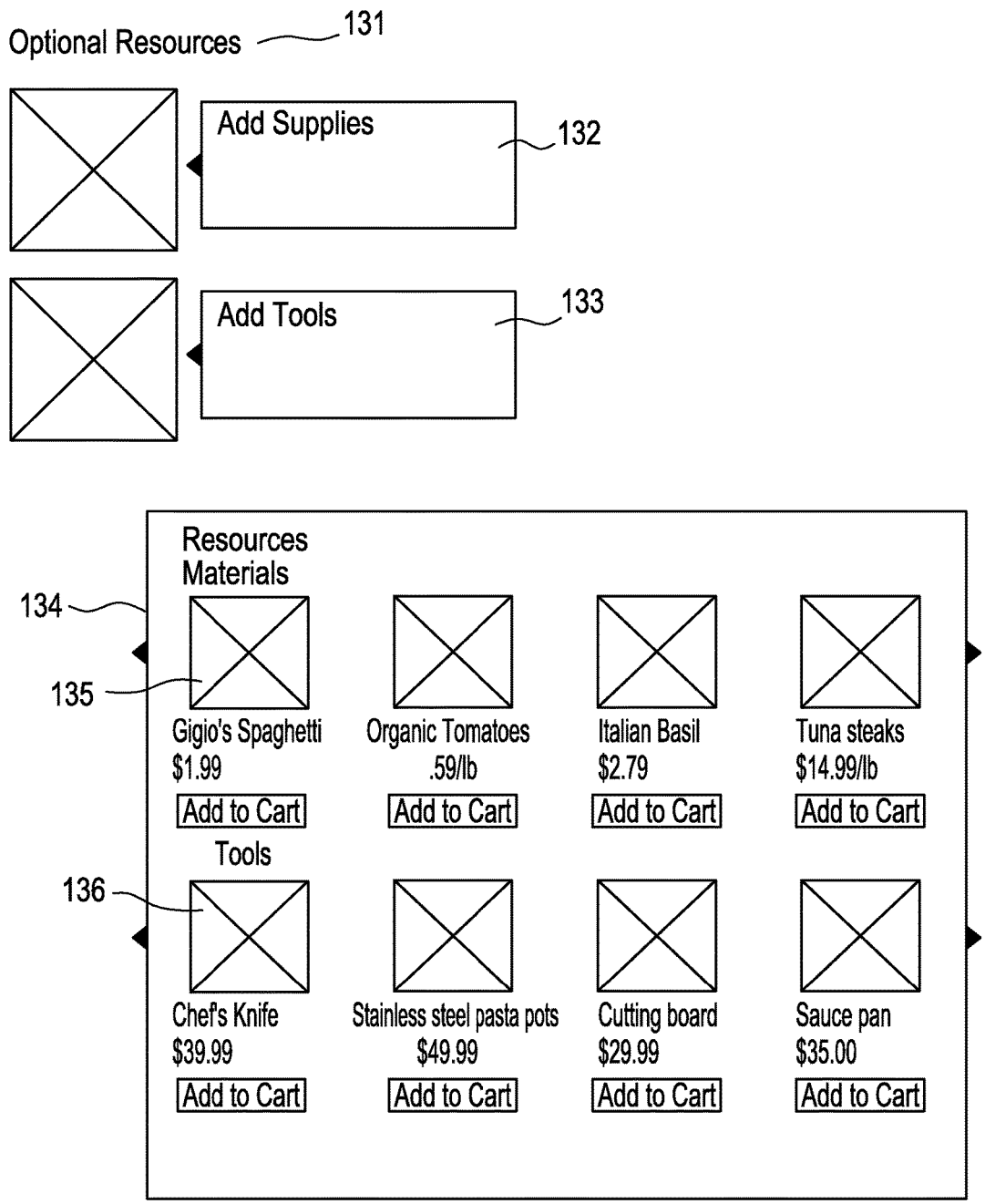
FIG. 13 is screenshots illustrating an exemplary method for providing and displaying project resource information, in accordance with a representative embodiment of the present invention.

FIG. 13 is screenshots illustrating an exemplary method for providing and displaying project resource information 132-133, 135-136, in accordance with a representative embodiment of the present invention. The screenshots of FIG. 13 may be displayed using elements of the system 10 of FIG. 1 including, for example, the server(s) 11, network(s) 12, external systems and applications 18, and/or computing device(s) 13 comprising user input device(s) 14, a display 15, a processor 16, and/or a memory 17. The system 10 may be arranged to support the input and display of project supplies 132, 135 and tools 133, 136, for example. As illustrated in FIG. 13, a project resources page or window 131 can facilitate the input of user-specifiable supplies 132 and tools 133 related to a completed project. The user-specifiable supplies 132 and tools 133 may be input by text boxes, buttons, menu options, links, or the like. A resource view page 134 can be displayed in response to a menu selection by a user of the project sharing application viewing a completed project, for example. The resource view page 134 may include the supplies 135 and tools 136 used to complete the project. The supplies 135 and tools 136 can be specified by a user that completed the project at the project resources page or window 131 and/or the project sharing application can automatically identify and populate the resource view page 134 with the applicable supplies 135 and tools 136, for example. In various embodiments, the resource view page 134 can include supply and tool information, cost, and mechanisms for purchasing the supplies 135 and tools 136, for example.

Figure 14:
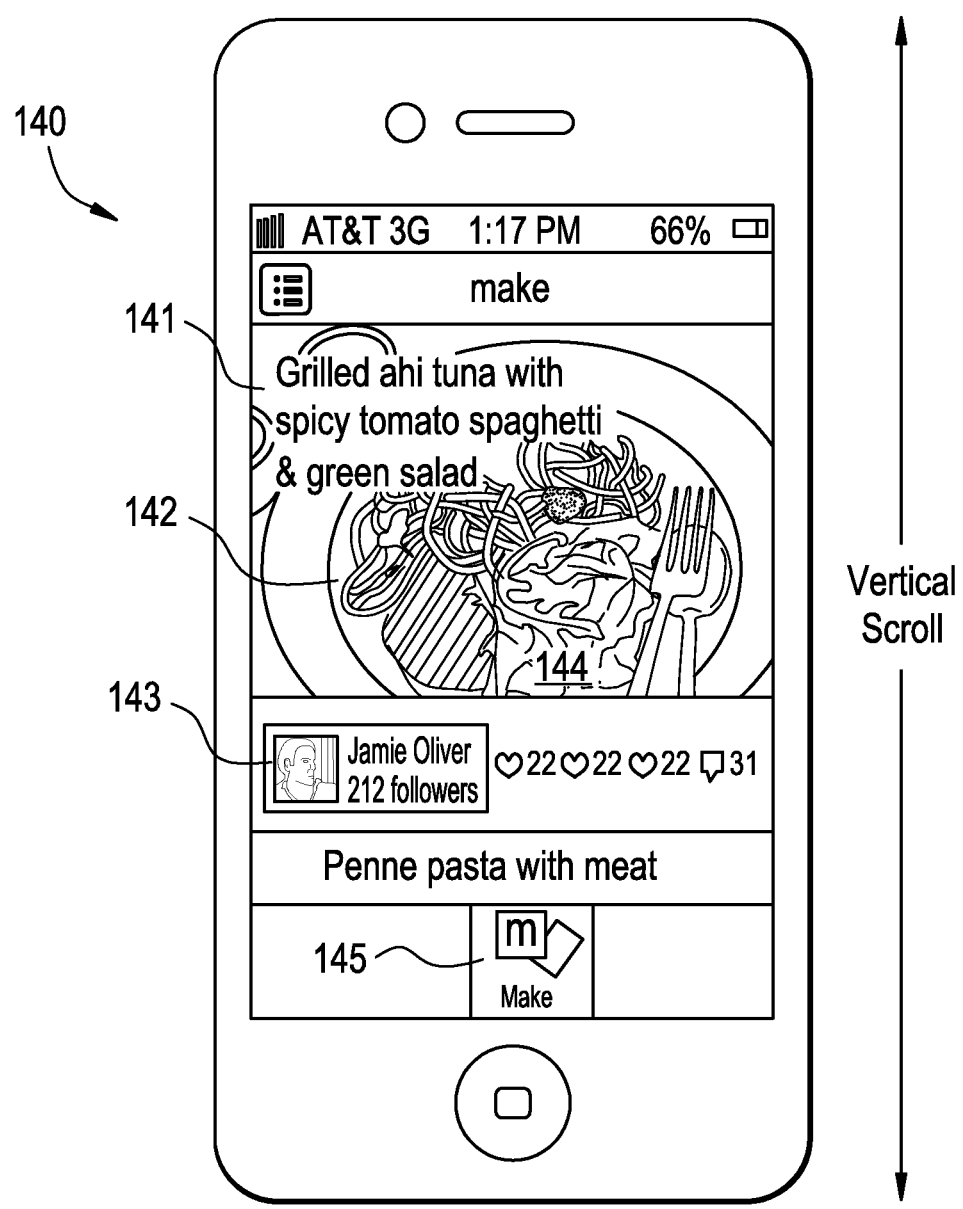
FIG. 14 is a screenshot illustrating an exemplary application homepage layout for display at a mobile computing device display, in accordance with a representative embodiment of the present invention.

FIG. 14 is a screenshot illustrating an exemplary application homepage layout 140 for display at a mobile computing device display 15, in accordance with a representative embodiment of the present invention. The screenshot of FIG. 14 may be displayed using elements of the system 10 of FIG. 1 including, for example, the server(s) 11, network(s) 12, external systems and applications 18, and/or computing device(s) 13 comprising user input device(s) 14, a display 15, a processor 16, and/or a memory 17. The system 10 may be arranged to support display of project-related information, for example. As illustrated in FIG. 14, the application homepage layout 140 can include one or more homepage feeds 141. For example, the application homepage 140 can be configured to scroll vertically, as illustrated in FIG. 14, or horizontally to show additional homepage fees 141. The homepage feed 141 can include one or more images 142 corresponding to a completed project. The homepage feed 141 can provide information identifying the user 143 that created the completed project. In various embodiments, a link, button, menu option, or any suitable selection mechanism 145 may be included on the application homepage 140 for adding a new completed project. The homepage feed 141 may include social actions 144 associated with a completed project, for example. The social actions 144 can include mechanisms to indicate that a user likes the completed project, would like to make the completed project, has made the completed project, and/or comments associated with the completed project, for example. In certain embodiments, the social actions 144 can also display the number of users that selected each of the social mechanisms.

Figure 15:
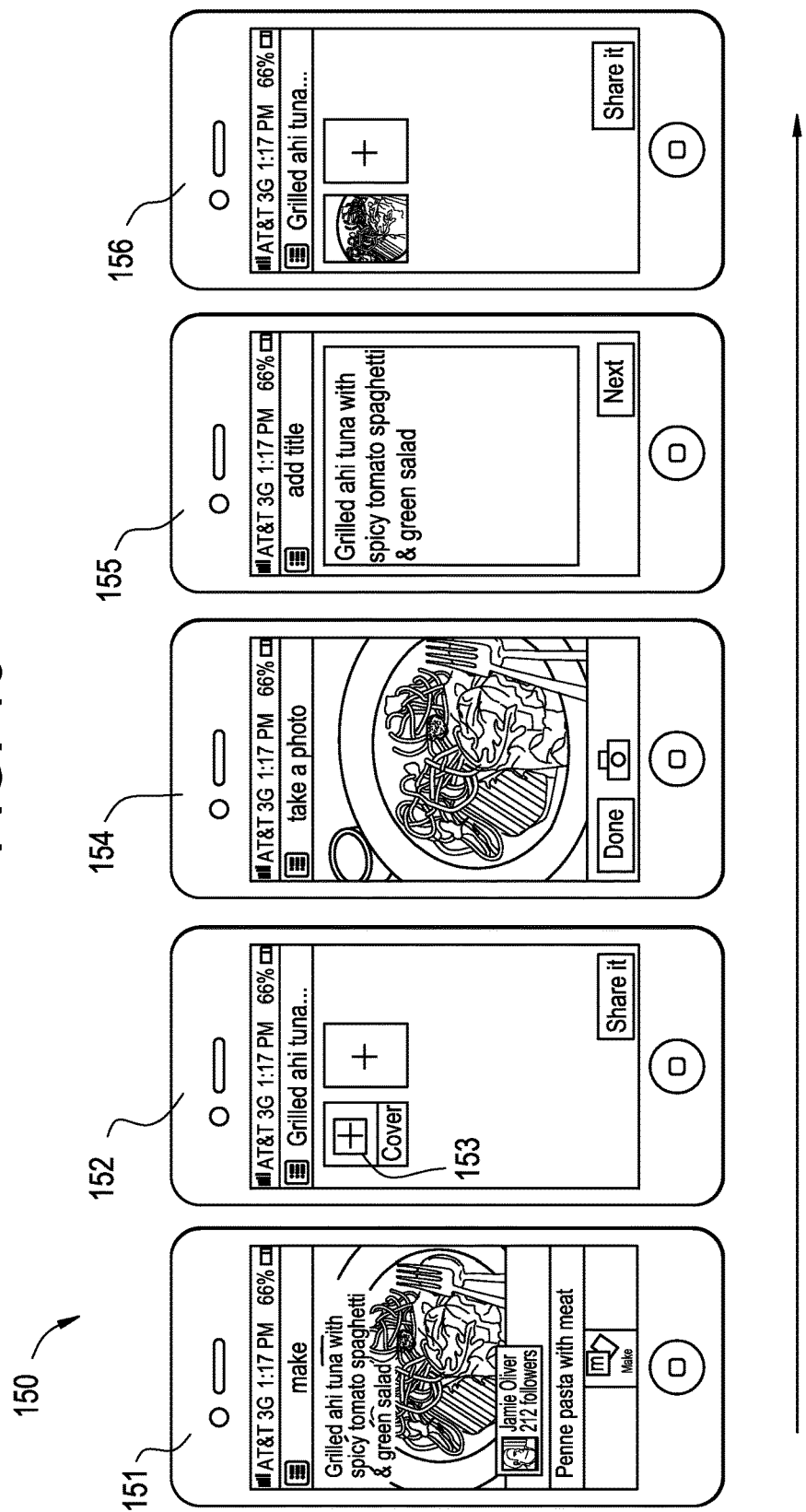
FIG. 15 is screenshots illustrating an exemplary method for creating a project, in accordance with a representative embodiment of the present invention.

FIG. 15 is screenshots illustrating an exemplary method 150 for creating a project, in accordance with a representative embodiment of the present invention. The screenshots of FIG. 15 may be displayed using elements of the system 10 of FIG. 1 including, for example, the server(s) 11, network(s) 12, external systems and applications 18, and/or computing device(s) 13 comprising user input device(s) 14, a display 15, a processor 16, and/or a memory 17. The system 10 may be arranged to support the creation of a project, for example. As illustrated in FIG. 15, a menu option, button, link, or the like at an application homepage 151 can be selected to trigger the initiation of a project creation flow. For example, as described with regard to FIG. 14, a link, button, menu option, or any suitable selection mechanism 145 may be included on the application homepage 140 for adding a new completed project. An add images page 152 providing options for adding project images 153 may be displayed in response to a selection at the application homepage 151 to create a project, for example. A camera feature 154 configured to cooperate with a camera user input device 14 of the computing device 13 can be triggered by selection of an add project image menu option 153, for example. The project sharing application may provide a text box or any suitable mechanism for entering a title of the project 155 to accompany a cover photo captured by the camera feature 154. The project sharing application can display the captured cover photo in add images page 156, for example.

Figure 16:
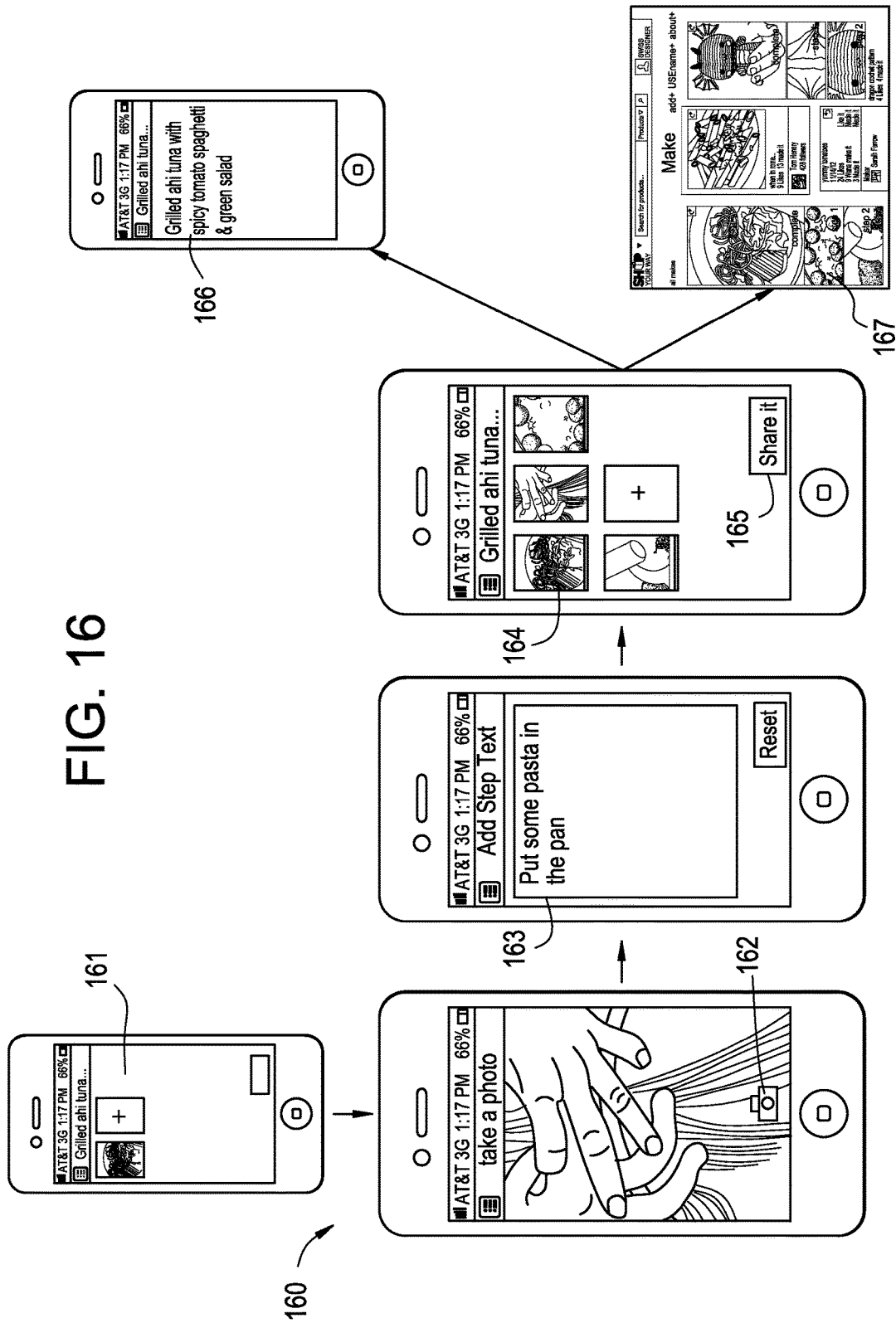
FIG. 16 is screenshots illustrating an exemplary method for adding and sharing instructions to complete a project, in accordance with a representative embodiment of the present invention.

FIG. 16 is screenshots illustrating an exemplary method 160 for adding and sharing instructions to complete a project, in accordance with a representative embodiment of the present invention. The screenshots of FIG. 16 may be displayed using elements of the system 10 of FIG. 1 including, for example, the server(s) 11, network(s) 12, external systems and applications 18, and/or computing device(s) 13 comprising user input device(s) 14, a display 15, a processor 16, and/or a memory 17. The system 10 may be arranged to facilitate the creation and sharing of project instructions, for example. As illustrated in FIG. 16, selection of a link, button, menu option or the like of an add images page 161 of the project sharing application, which may correspond with the add images page 156 illustrated in FIG. 15 for example, may trigger a camera feature 162 configured to cooperate with a camera user input device 14 of the computing device 13. The camera feature 162 is configured to capture an image in response to an input received at the user input device 14, for example. An add step text window or page 163 including a text box or any suitable mechanism for entering instructions corresponding to the captured image is displayed by the project sharing application in response to receiving the captured image. The project sharing application can display the captured image in add images page 164, for example. The add images page 164 displays the cover image and images corresponding to each step of the project instructions. The add images page 164 is configured to facilitate the adding of additional images. The add images page 164 may include a button, menu option, link or the like 165 for sharing the project after the images and instructions are completed. The completed project can be displayed 166, 167 in homepage feeds of the project sharing application. The project sharing application homepage feeds can be displayed at computing device display(s) 15. In various embodiments, the computing device 13 may be a mobile device 166, desktop device 167, or any suitable computing device. Although FIGS. 15-16 illustrate mobile devices for creating and sharing a project, unless otherwise set forth in the claims, any suitable computing device 13 can be used to create and share the project.

Figure 17:
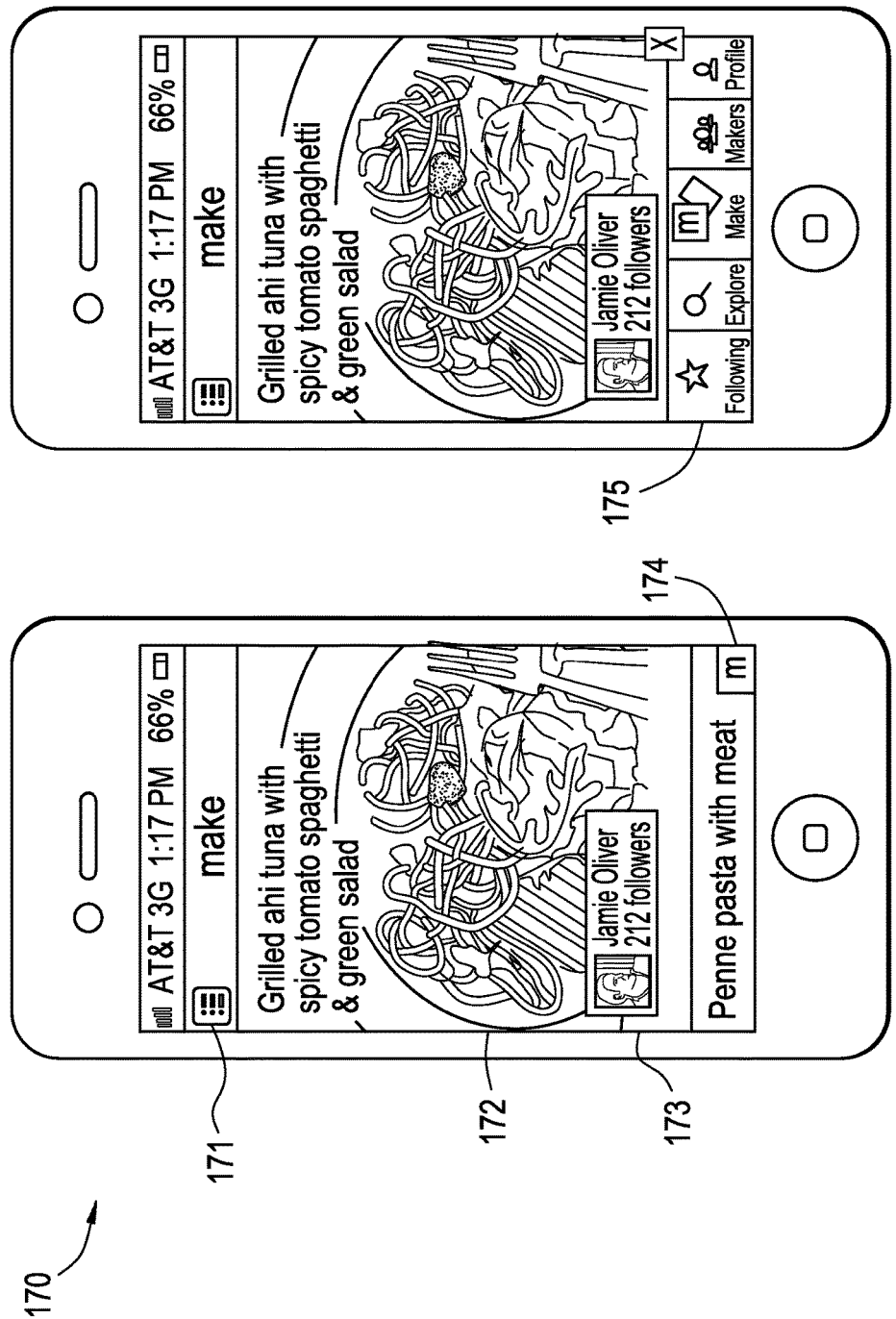
FIG. 17 is screenshots illustrating an exemplary method for accessing a menu at an application homepage displayed at a mobile computing device display, in accordance with a representative embodiment of the present invention.

FIG. 17 is screenshots illustrating an exemplary method 170 for accessing a menu 175 at an application homepage 171 displayed at a mobile computing device display 15, in accordance with a representative embodiment of the present invention. The screenshots of FIG. 17 may be displayed using elements of the system 10 of FIG. 1 including, for example, the server(s) 11, network(s) 12, external systems and applications 18, and/or computing device(s) 13 comprising user input device(s) 14, a display 15, a processor 16, and/or a memory 17. The system 10 may be arranged to support menu access at an application homepage, for example. As illustrated in FIG. 17, the application homepage 171 can include one or more homepage feeds 172. For example, the application homepage 171 can be configured to scroll vertically, as illustrated in FIG. 14, or horizontally to show additional homepage feeds 172. The homepage feed 172 can provide information identifying the user 173 that created the completed project. In various embodiments, a link, button, menu option, or any suitable selection mechanism 174 may be included on the application homepage 171 for accessing a menu 175. The menu 175 can include options for following a user, searching for projects, creating a new project, searching for users, accessing profile information, and/or any suitable menu options.

Figure 18:
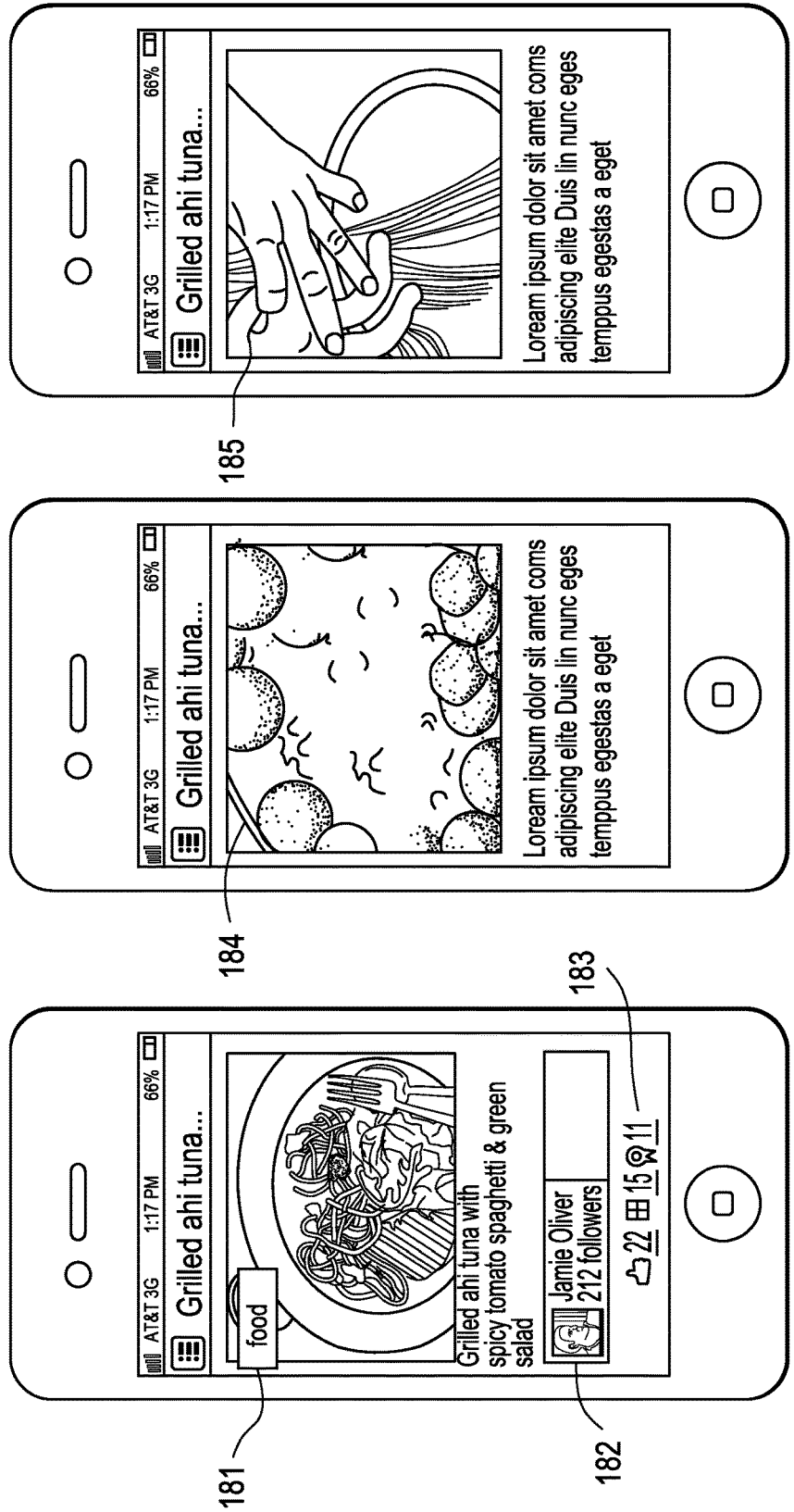
FIG. 18 is screenshots illustrating exemplary completed instruction pages for display at a mobile computing device display, in accordance with a representative embodiment of the present invention.

FIG. 18 is screenshots illustrating exemplary completed instruction pages for display at a mobile computing device display 15, in accordance with a representative embodiment of the present invention. The screenshots of FIG. 18 may be displayed using elements of the system 10 of FIG. 1 including, for example, the server(s) 11, network(s) 12, external systems and applications 18, and/or computing device(s) 13 comprising user input device(s) 14, a display 15, a processor 16, and/or a memory 17. The system 10 may be arranged to facilitate display of visual and/or textual step-by step instructions for completing a project, for example. As illustrated in FIG. 18, a cover page 181 and instructions steps 184, 185 can be displayed at a computing device display 15. In various embodiments, each cover page 181 and step 184, 185 may be displayed separately on a distinct page that can be accessed by scrolling horizontally or vertically, for example. The cover page 181 may include a main image, title, identify of the user that created the project 182, and social actions 183, for example. The instruction step pages 184, 185 may include instruction images and/or text, for example.

Figure 19:
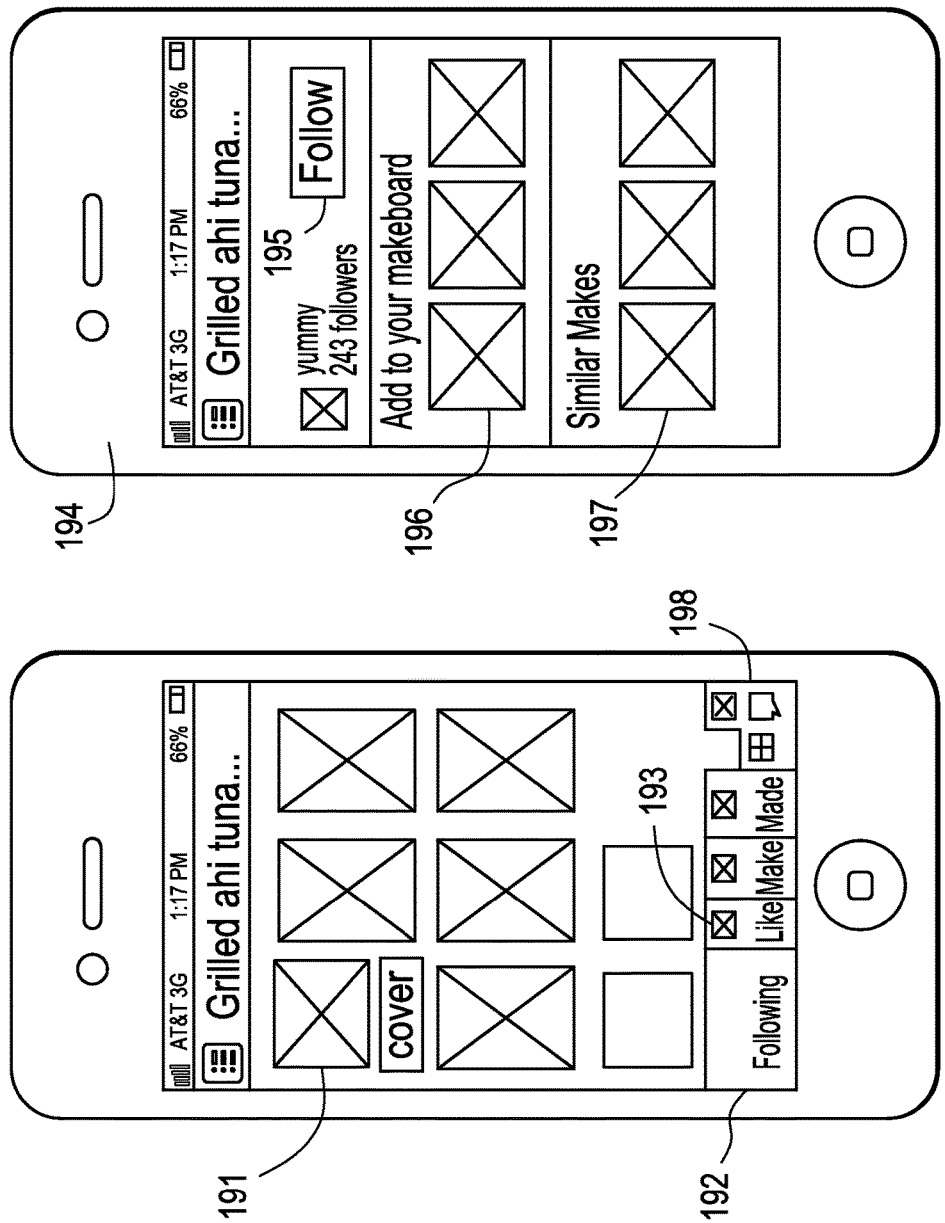
FIG. 19 is screenshots illustrating an exemplary grid view of completed instructions and an exemplary user actions page for display at a mobile computing device display, in accordance with a representative embodiment of the present invention.

FIG. 19 is screenshots illustrating an exemplary grid view of completed instructions 191 and an exemplary user actions page 194 for display at a mobile computing device display 15, in accordance with a representative embodiment of the present invention. The screenshots of FIG. 19 may be displayed using elements of the system 10 of FIG. 1 including, for example, the server(s) 11, network(s) 12, external systems and applications 18, and/or computing device(s) 13 comprising user input device(s) 14, a display 15, a processor 16, and/or a memory 17. The system 10 may be arranged to support the display of completed instructions and user options, for example. As illustrated in FIG. 19, the project sharing application may provide a list or grid view page 191 of the steps of the completed project, such that selection of a step can trigger the project sharing application to display the selected instruction step. In various embodiments, the project sharing application can toggle between the list or grid view page 191 and completed instruction pages, such as the completed instruction pages described with respect to FIG. 18, for example. The list or grid view page 191 can include a collapsible menu bar 192, social actions 19, and a completed project comment mechanism 198, for example. The project sharing application can provide a user actions page 194 that includes buttons, links, menu options or the like for following a project category associated with the completed project 195, adding the completed project to a selectable product category 196, and/or selecting a project recommended by the project sharing application 197, for example. In various embodiments, a user of the project sharing application can scroll vertically and/or horizontally between the grid view of completed instructions 191 and the user actions page 194, for example.

Figure 20:
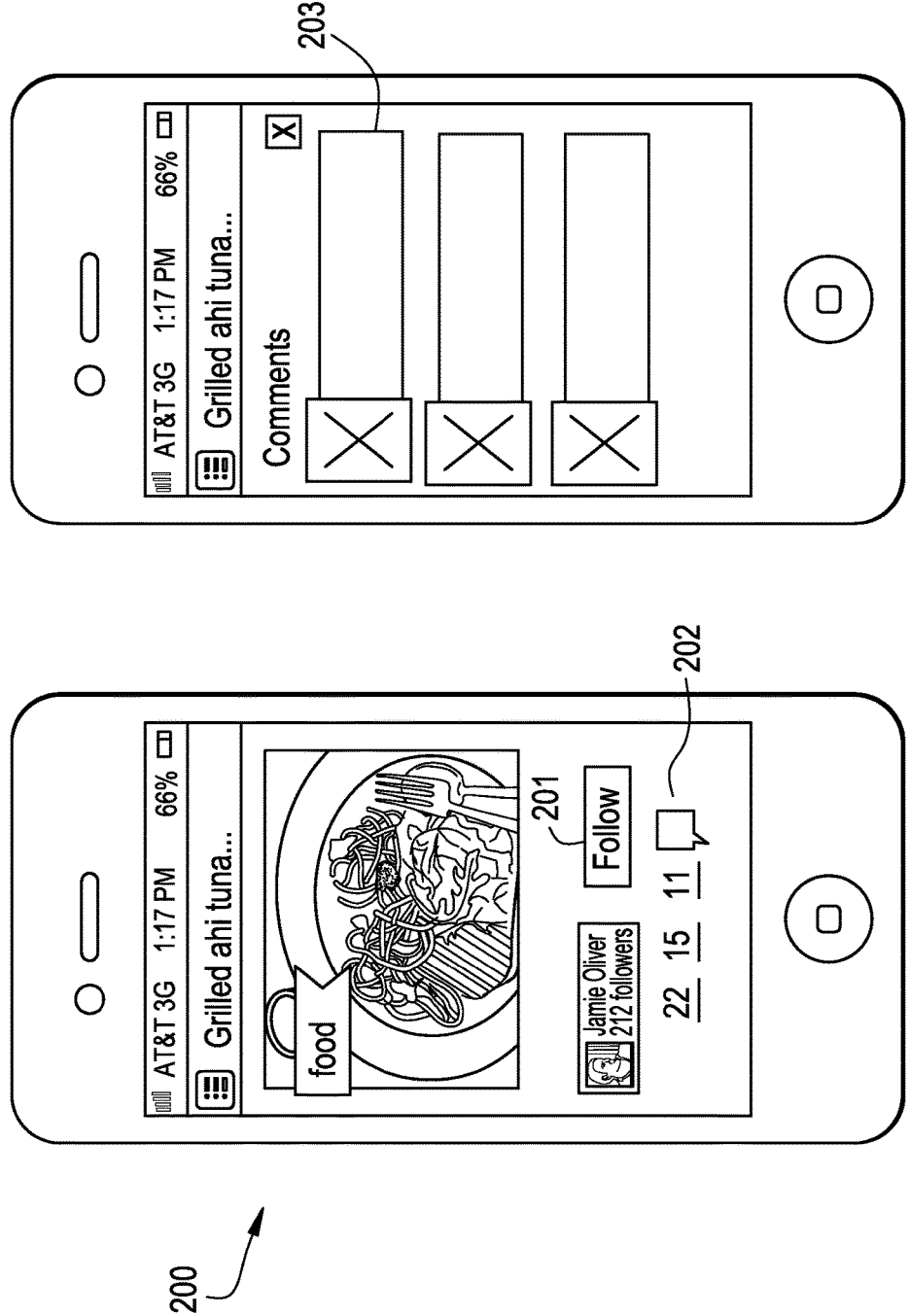
FIG. 20 is screenshots illustrating an exemplary method for following a user, and for viewing and/or adding comments associated with a project, in accordance with a representative embodiment of the present invention.

FIG. 20 is screenshots illustrating an exemplary method 200 for following a user 201, and for viewing and/or adding comments 203 associated with a project, in accordance with a representative embodiment of the present invention. The screenshots of FIG. 20 may be displayed using elements of the system 10 of FIG. 1 including, for example, the server(s) 11, network(s) 12, external systems and applications 18, and/or computing device(s) 13 comprising user input device(s) 14, a display 15, a processor 16, and/or a memory 17. The system 10 may be arranged to support following a user 201 and commenting on completed projects 203, for example. As illustrated in FIG. 20, a project sharing application can display a homepage feed that provide information identifying a completed project, the user that created the completed project, and/or social actions related to the completed project, for example. In various embodiments, a link, button, menu option, or any suitable selection mechanism 201 may be included on the homepage feed for following a user that created the completed project, for example. In certain embodiments, a link, button, menu option, or any suitable selection mechanism 202 can be included on the homepage feed for providing comments regarding the completed project, for example. In response to a user input selecting the comment mechanism 202, a comments page 203 can be displayed. The comments page 203 can include user comments and provide a text box or any suitable mechanism for adding comments, for example.

Figure 21:
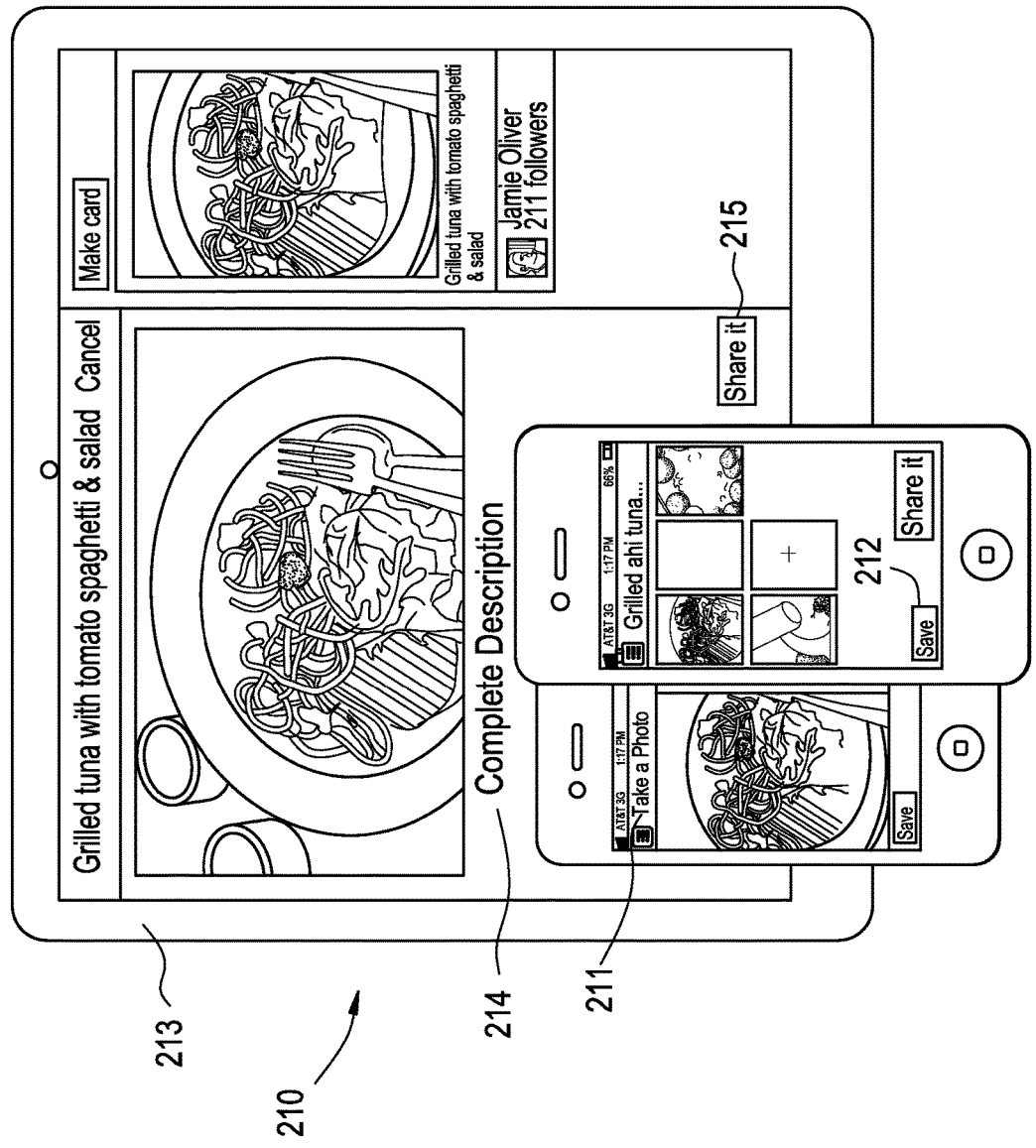
FIG. 21 is screenshots illustrating an exemplary method for synchronizing the creation of a project, in accordance with a representative embodiment of the present invention.

FIG. 21 is screenshots illustrating an exemplary method 210 for synchronizing the creation of a project, in accordance with a representative embodiment of the present invention. The screenshots of FIG. 21 may be displayed using elements of the system 10 of FIG. 1 including, for example, the server(s) 11, network(s) 12, external systems and applications 18, and/or computing device(s) 13 comprising user input device(s) 14, a display 15, a processor 16, and/or a memory 17. The system 10 may be arranged to support the synchronization of information from multiple computing devices 13 to create a project, for example. As illustrated in FIG. 21, a project sharing application can be executed to capture images 211 corresponding to project instruction steps. The project instruction steps may be saved by selecting a button, menu option, or any suitable save selection mechanism. An incomplete project can be accessed for completion by the project sharing application retrieving the stored project. The incomplete project may be displayed at a project creation page 213, such as the project creation page described with respect to FIG. 4, for example. The project creation page 213 can include text boxes, button, menu options, links, and the like for supplementing the incomplete project with textual instructions and/or images 214 and for sharing the project after completion 215, for example. In certain embodiments, projects can be created using multiple computing devices 13, where project information created and stored is synchronized with additional project information created at a different computing device 13, for example.

Figure 22:
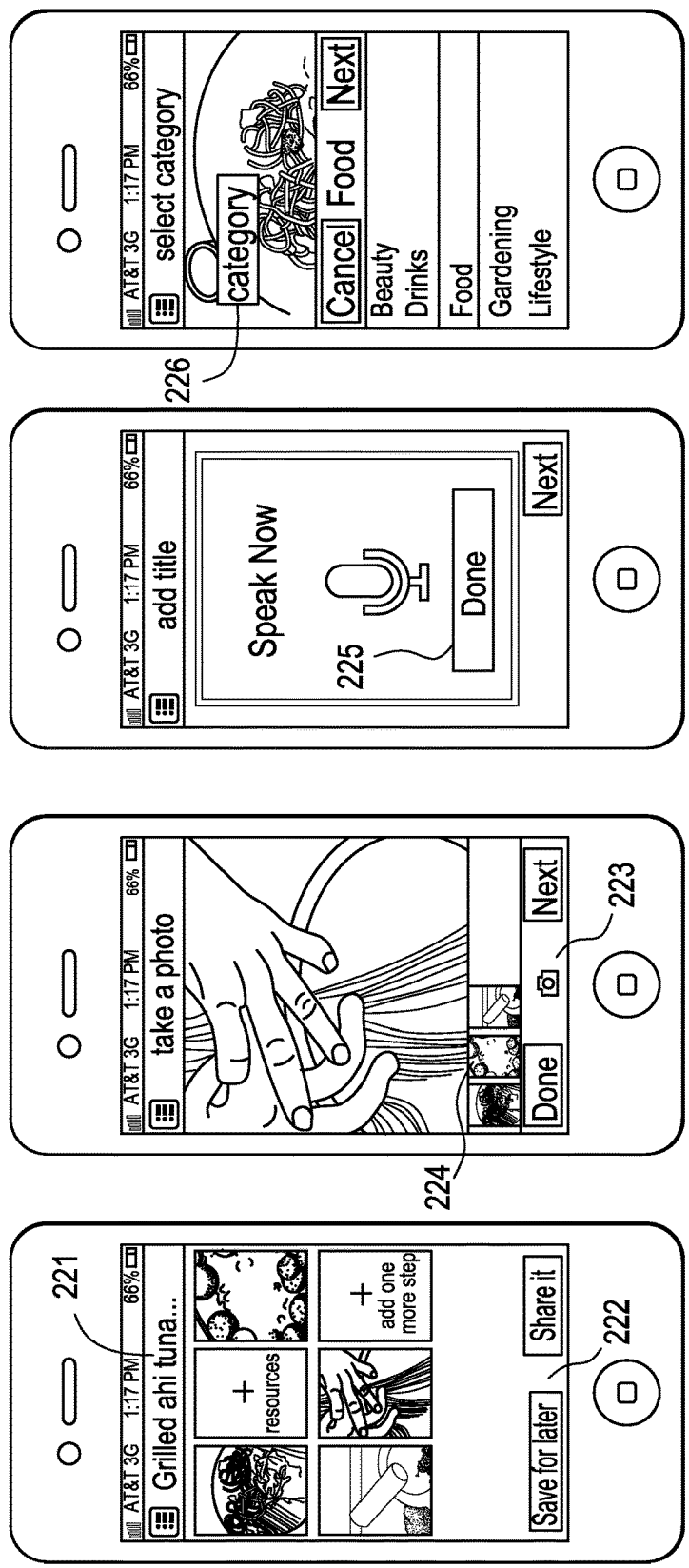
FIG. 22 is screenshots illustrating exemplary application features for creating a project, in accordance with a representative embodiment of the present invention.

FIG. 22 is screenshots illustrating exemplary application features for creating a project, in accordance with a representative embodiment of the present invention. The screenshots of FIG. 22 may be displayed using elements of the system 10 of FIG. 1 including, for example, the server(s) 11, network(s) 12, external systems and applications 18, and/or computing device(s) 13 comprising user input device(s) 14, a display 15, a processor 16, and/or a memory 17. The system 10 may be arranged to support features for creating a project, for example. As illustrated in FIG. 22, the project sharing application can include for adding resources 221. For example, the project sharing application can facilitate the specification of supplies and tools used to create a project as described with reference to FIG. 13. The project sharing application may support features for saving and sharing projects 222, for example. The project sharing application can include a camera feature configured to capture images 223 and facilitate the input of one or more images simultaneously 224, for example. The project sharing application may include features for inputting text and/or audio using a speech input feature 225 for cooperating with a microphone user input device 14, for example. In various embodiments, the speech input feature 225 may be configured to convert speech to text. The project sharing application can include category selection features 226 configured to receive a user input to select a project category to associate with a completed project, for example.

Figure 23:
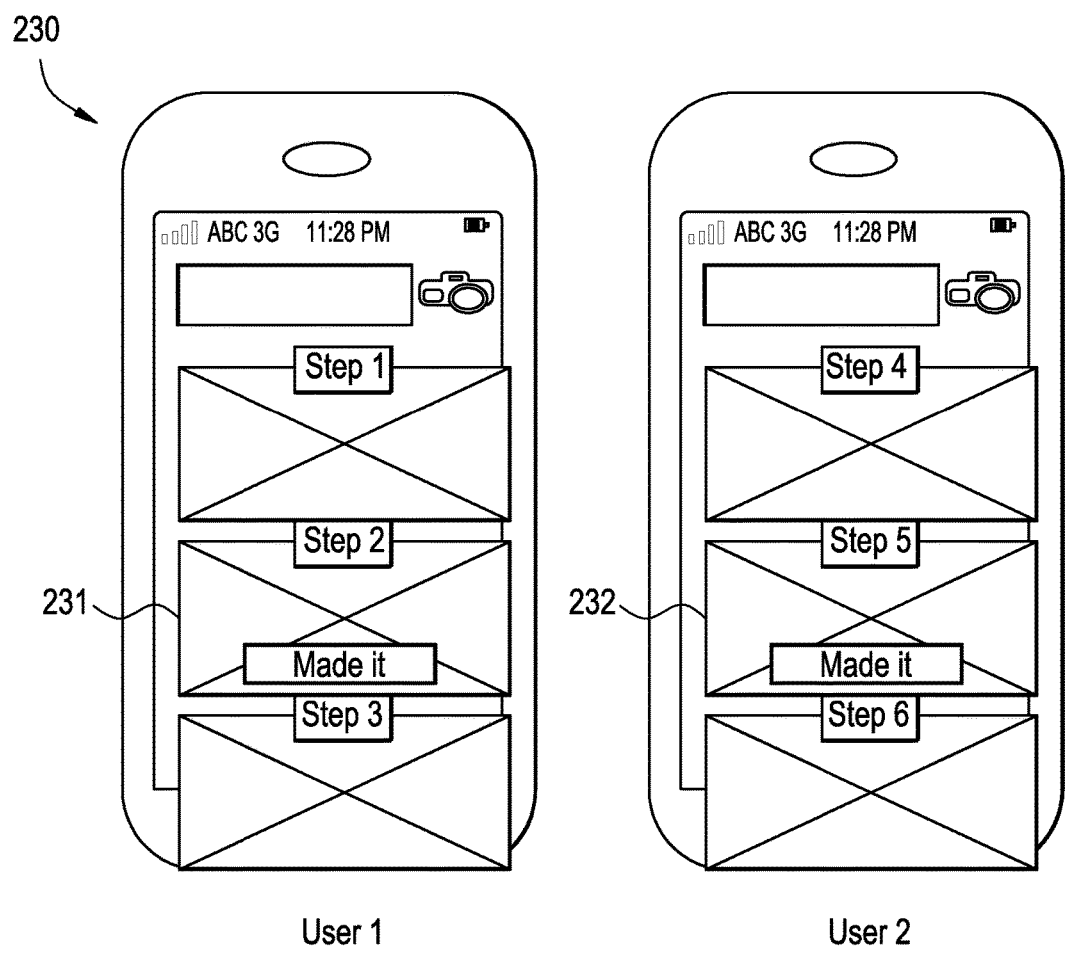
FIG. 23 is screenshots illustrating an exemplary method for creating a project in a distributed fashion by multiple computing devices, in accordance with a representative embodiment of the present invention.

FIG. 23 is screenshots illustrating an exemplary method 230 for creating a project in a distributed fashion by multiple computing devices 13, in accordance with a representative embodiment of the present invention. The screenshots of FIG. 23 may be displayed using elements of the system 10 of FIG. 1 including, for example, the server(s) 11, network(s) 12, external systems and applications 18, and/or computing device(s) 13 comprising user input device(s) 14, a display 15, a processor 16, and/or a memory 17. The system 10 may be arranged to support creation of a project by multiple users, for example. As illustrated in FIG. 23, a project sharing application may be executed by a first user to create one or more instruction steps for a project 231. The project sharing application can also be executed by a second user to create additional steps for completing the project 232. For example, a first user can execute the project sharing application to create instruction steps for installing a sink for a bathroom remodel project and a second user can execute the project sharing application to create instruction steps for installing light fixtures for a bathroom remodel project. In various embodiments, the instruction steps 231 can be created accessing the project sharing application at a first computing device 13 and the instruction steps 232 can be created accessing the project sharing application at a second computing device 13. The instruction steps 231, 232 can be created substantially at the same time or at different times, for example.

Figure 24:
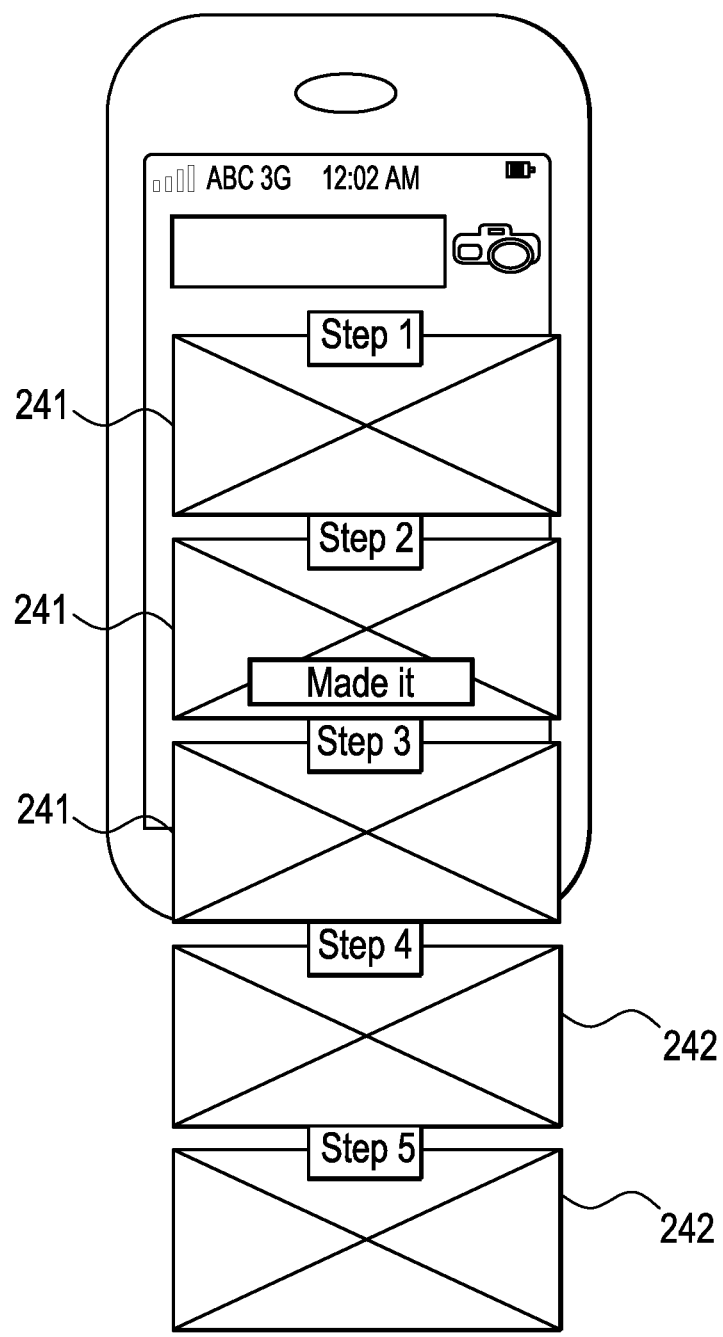
FIG. 24 is a screenshot illustrating an exemplary project created by multiple computing devices in a distributed fashion, in accordance with a representative embodiment of the present invention.

FIG. 24 is a screenshot illustrating an exemplary project created by multiple computing devices 13 in a distributed fashion, in accordance with a representative embodiment of the present invention. The screenshot of FIG. 24 may be displayed using elements of the system 10 of FIG. 1 including, for example, the server(s) 11, network(s) 12, external systems and applications 18, and/or computing device(s) 13 comprising user input device(s) 14, a display 15, a processor 16, and/or a memory 17. The system 10 may be arranged to facilitate combining instruction steps created by different users and/or at different computing devices 13, for example. As illustrated in FIG. 24, a project sharing application can display instruction steps 241, 242 for completing a project. The instruction steps 241, 242 can be provided by different users and/or different computing devices 13, as described with reference to FIG. 23, for example. In various embodiments, the instruction steps 241, 242 for completing the project can be combined by synching the stored instruction steps 241, 242 at the server 11, for example. In certain embodiments, the project sharing application can include a mobile device bump feature for transferring instruction steps 241, 242 between mobile computing devices 13 to combine and synchronize the instruction steps 241, 242, for example.

Aspects of the present invention may be seen in a system 10 and method 20 for discovering and sharing projects. In a representative embodiment of the present invention, the method 20 comprises receiving 21 a project request by at least one processor 16 of one or more computing devices 13 executing a project sharing application. The method 20 also comprises receiving 22 step-by-step instructions for completing the project request by the at least one processor 16. The method 20 comprises sharing 23, by one or more servers 11 communicatively coupled to the at least one processor 16, the step-by-step instructions for completing the project request with computing devices 13 executing the project sharing application.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for searching and sharing step-by-step instructions for completing a project over a network, the method comprising:
    receiving, by at least one processor of a first user computing device executing a project sharing application, a project instructions request via the project sharing application, the project instructions request comprising one or both of an image and text identifying a project that a user desires instructions for completing;
    receiving, by at least one processor of a second user computing device executing the project sharing application, step-by-step instructions having a plurality of instructional steps submitted via the project sharing application and in response to the project instructions request for completing the project, wherein the first user computing device and the second user computing device are two of a plurality of user computing devices executing the project sharing application, each of the plurality of user computing devices communicatively coupled via a network, comprising:
        receiving one or both of textual or audio information provided via the project sharing application, the one or both of textual or audio information corresponding to each instructional step of the plurality of instructional steps of the step-by-step instructions for completing the project,
        receiving a series of uploaded images, each of the series of uploaded images corresponding to one or more of the plurality of instructional steps of the step-by-step instructions for completing the project,
        automatically tagging, by the project sharing application, at least one of the series of uploaded images, the tag comprising information related to one or both of supplies for completing the project and tools for completing the project,
        wherein the information related to the one or both of the supplies and the tools comprises a link to a website having information related to the one or both of the supplies and the tools, and
        wherein the information included in the tag related to the one or both of the supplies and the tools is searchable via the network by the plurality of user computing devices executing the project sharing application to identify and retrieve the step-by-step instructions having the plurality of instructional steps for completing the project;
    sharing, by the project sharing application via the network, the step-by-step instructions for completing the project in response to a search request by one or more of the plurality of user computing devices executing the project sharing application,
    providing, via the project sharing application, a notification to the first user computing device that the project instructions request is completed, and
    sharing the step-by-step instructions with the first user computing device.

2. The method according to claim 1, wherein the project instructions request comprises the image.

3. The method according to claim 2, wherein the image is acquired by a photo acquisition feature of the project sharing application configured to cooperate with a camera.

4. The method according to claim 1, wherein the step-by-step instructions comprise accompanying information comprising one or more of a skill level, a time, and a cost for completing the project.

5. The method according to claim 1, comprising transmitting, by the second user computing device, the notification that the project instructions request is completed, wherein the notification comprises one or more of:
    an electronic mail message sent to a user of the first user computing device,
    a message sent within the project sharing application to the user, and
    a post of the step-by-step instructions to a homepage of a project sharing application account associated with the user.

6. The method according to claim 1, wherein the project instructions request is shared with the plurality of user computing devices executing the project sharing application via the network.

7. The method according to claim 6, comprising receiving, by the at least one processor of the second user computing device via the project sharing application, a selection of the project instructions request to provide the step-by-step instructions for completing the project.

8. A method for searching and sharing step-by-step instructions for completing a project over a network, the method comprising:
    receiving, by at least one server from at least one user computing device executing a project sharing application, a project instructions request via the project sharing application, the project instructions request comprising one or both of an image and text identifying a project that a user desires instructions for completing, wherein the at least one user computing device is at least one of a plurality of user computing devices executing the project sharing application, each of the plurality of user computing devices and the at least one server communicatively coupled via a network;
    receiving, by the at least one server from the at least one user computing device via the project sharing application, step-by-step instructions having a plurality of instructional steps in response to the project instructions request for completing the project, comprising:
        receiving one or both of textual or audio information provided via the project sharing application, the one or both of textual or audio information corresponding to each instructional step of the plurality of instructional steps of the step-by-step instructions for completing the project,
        receiving a series of uploaded images, each of the series of uploaded images corresponding to one or more of the plurality of instructional steps of the step-by-step instructions for completing the project, automatically tagging, by the project sharing application, at least one of the series of uploaded images, the tag comprising information related to one or both of supplies for completing the project and tools for completing the project, wherein the information related to the one or both of the supplies and the tools comprises a link to a website having information related to the one or both of the supplies and the tools, and wherein the information included in the tag related to the one or both of the supplies and the tools is searchable via the network by the plurality of user computing devices executing the project sharing application to identify and retrieve the step-by-step instructions having the plurality of instructional steps for completing the project;

sharing, by the at least one server via the network, the step-by-step instructions for completing the project in response to a search request by one or more of the plurality of user computing devices executing the project sharing application;

providing, by the at least one server to the at least one user computing device that provided the project instructions request, a notification via the project sharing application that the project instructions request is completed; and sharing, by the at least one server, the step-by-step instructions with the at least one user computing device that provided the project instructions request.

9. The method according to claim 8, wherein:

the at least one user computing device comprises a first user computing device and a second user computing device, the project instructions request is received from the first user computing device, the step-by-step instructions are received from the second user computing device, and the step-by-step instructions are shared by the at least one server with the first user computing device.

10. The method according to claim 9, wherein one or both of the first user computing device and the second user computing device is a mobile computing device.

11. The method according to claim 10, wherein the project instructions request comprises the image.

12. The method according to claim 11, wherein one or both of the image and the series of images is acquired by a photo acquisition feature of the project sharing application configured to cooperate with a camera of the mobile computing device.

13. The method according to claim 9, comprising transmitting, by the at least one server, the notification that the project instructions request is completed, wherein the notification comprises one or more of:

an electronic mail message sent to a user of the first user computing device, a message sent within the project sharing application to the user, and a post of the step-by-step instructions to a homepage of a project sharing application account associated with the user.

14. The method according to claim 8, wherein the step-by-step instructions comprises accompanying information comprising one or more of a skill level, a time, and a cost for completing the project.

15. The method according to claim 8, comprising sharing, by the at least one server via the project sharing application, the project instructions request with the plurality of user computing devices executing the project sharing application.

16. The method according to claim 15, comprising receiving, by the at least one server via the project sharing application, a selection of the project instructions request to provide the step-by-step instructions for completing the project.

* * * * *